United States Patent
Gies et al.

(10) Patent No.: US 8,832,938 B2
(45) Date of Patent: Sep. 16, 2014

(54) GROUND MOUNTED SOLAR MODULE INTEGRATION SYSTEM

(75) Inventors: Mark Charles Gies, Sudbury, MA (US); David P. Anderson, Wellesley, MA (US); Daniel P. Leary, North Andover, MA (US)

(73) Assignee: Panelclaw, Inc., North Andover, MA (US)

( * ) Notice: Subject to any disclaimer, the term of this patent is extended or adjusted under 35 U.S.C. 154(b) by 351 days.

(21) Appl. No.: 12/846,259

(22) Filed: Jul. 29, 2010

(65) Prior Publication Data
US 2011/0024582 A1 Feb. 3, 2011

Related U.S. Application Data

(63) Continuation-in-part of application No. 12/056,791, filed on Mar. 27, 2008.

(60) Provisional application No. 61/229,622, filed on Jul. 29, 2009.

(51) Int. Cl.
| | | |
|---|---|---|
| *E04D 13/18* | (2014.01) | |
| *B21D 53/02* | (2006.01) | |
| *F24J 2/52* | (2006.01) | |
| *H01L 31/042* | (2014.01) | |

(52) U.S. Cl.
CPC *F24J 2/525* (2013.01); *Y02E 10/50* (2013.01); *F24J 2/526* (2013.01); *F24J 2/5264* (2013.01); *F24J 2/5239* (2013.01); *F24J 2/5256* (2013.01); *F24J 2002/5292* (2013.01); *F24J 2002/5281* (2013.01); *Y02E 10/47* (2013.01); *Y02B 10/20* (2013.01); *H01L 31/0422* (2013.01); *F24J 2/5245* (2013.01)

USPC ............. 29/890.033; 52/173.3; 52/745.2

(58) Field of Classification Search
CPC ........ Y02B 10/12; Y02B 10/20; Y02E 10/47; F24J 2/523; F24J 2/5264
USPC ........... 52/173.1, 173.3, 745.2; 136/244, 251; 29/890.033; 126/696, 623
See application file for complete search history.

(56) References Cited

U.S. PATENT DOCUMENTS

| | | | |
|---|---|---|---|
| 811,274 A | * | 1/1906 | Carter ................... 126/684 |
| 2,971,736 A | * | 2/1961 | Enneper ................ 248/163.1 |

(Continued)

FOREIGN PATENT DOCUMENTS

| | | |
|---|---|---|
| CN | 2435706 | 6/2001 |
| CN | 201401994 | 2/2010 |

(Continued)

OTHER PUBLICATIONS

International Search Report and Written Opinion in corresponding International Application No. PCT/US2009/0038496 dated May 28, 2009.

(Continued)

*Primary Examiner* — Christine T Cajilig
(74) *Attorney, Agent, or Firm* — Foley & Lardner LLP; Christopher J. McKenna

(57) ABSTRACT

Embodiments of the present inventions are directed to systems, devices for use with systems, and method of mounting and retaining solar panels. A solar module mounting system may include: a support mechanism including a support post pivotably attached to a support base, and an attachment module for attaching a solar panel to the support mechanism.

20 Claims, 22 Drawing Sheets

(56) References Cited

U.S. PATENT DOCUMENTS

| | | | |
|---|---|---|---|
| 4,165,853 A * | 8/1979 | Brandt | 248/237 |
| 4,226,256 A | 10/1980 | Hawley | |
| 4,269,173 A * | 5/1981 | Krueger et al. | 126/634 |
| 4,336,413 A | 6/1982 | Tourneux | |
| 4,371,139 A * | 2/1983 | Clark | 248/237 |
| 4,966,631 A | 10/1990 | Matlin et al. | |
| 5,125,608 A * | 6/1992 | McMaster et al. | 248/163.1 |
| 5,143,556 A | 9/1992 | Matlin | |
| 5,228,924 A | 7/1993 | Barker et al. | |
| 5,509,973 A | 4/1996 | Ishikawa et al. | |
| 5,524,401 A | 6/1996 | Ishikawa et al. | |
| 5,571,338 A | 11/1996 | Kadonome et al. | |
| 5,603,187 A * | 2/1997 | Merrin et al. | 52/58 |
| 5,706,617 A | 1/1998 | Hirai et al. | |
| 5,740,996 A * | 4/1998 | Genschorek | 248/237 |
| 5,746,839 A | 5/1998 | Dinwoodie | |
| 5,890,333 A | 4/1999 | Boroviak | |
| 6,061,978 A | 5/2000 | Dinwoodie et al. | |
| 6,148,570 A | 11/2000 | Dinwoodie et al. | |
| 6,495,750 B1 | 12/2002 | Dinwoodie | |
| 6,501,013 B1 | 12/2002 | Dinwoodie | |
| 6,534,703 B2 | 3/2003 | Dinwoodie | |
| 6,570,084 B2 | 5/2003 | Dinwoodie | |
| 6,617,507 B2 | 9/2003 | Mapes et al. | |
| 6,722,357 B2 * | 4/2004 | Shingleton | 126/600 |
| 6,730,841 B2 | 5/2004 | Heckeroth | |
| 6,784,360 B2 | 8/2004 | Nakajima et al. | |
| 6,809,251 B2 | 10/2004 | Dinwoodie | |
| 6,809,253 B2 | 10/2004 | Dinwoodie | |
| 6,856,496 B1 | 2/2005 | Mucci et al. | |
| 6,883,290 B2 | 4/2005 | Dinwoodie | |
| 6,959,517 B2 | 11/2005 | Poddany et al. | |
| 6,967,278 B2 | 11/2005 | Hatsukaiwa et al. | |
| 6,968,654 B2 | 11/2005 | Moulder et al. | |
| 7,012,188 B2 | 3/2006 | Erling | |
| 7,178,295 B2 | 2/2007 | Dinwoodie | |
| 7,260,918 B2 | 8/2007 | Liebendorfer | |
| 7,297,866 B2 | 11/2007 | Aschenbrenner | |
| 7,554,030 B2 * | 6/2009 | Shingleton | 136/246 |
| 8,101,849 B2 * | 1/2012 | Almy et al. | 136/246 |
| 8,272,176 B2 * | 9/2012 | Wallgren | 52/173.3 |
| 2003/0010375 A1 | 1/2003 | Dinwoodie | |
| 2003/0015636 A1 | 1/2003 | Liebendorfer | |
| 2004/0007260 A1 | 1/2004 | Dinwoodie | |
| 2004/0163338 A1 | 8/2004 | Liebendorfer | |
| 2005/0126621 A1 | 6/2005 | Dinwoodie et al. | |
| 2005/0144870 A1 | 7/2005 | Dinwoodie | |
| 2005/0229924 A1 * | 10/2005 | Luconi et al. | 126/696 |
| 2005/0257453 A1 | 11/2005 | Cinnamon | |
| 2006/0118163 A1 | 6/2006 | Plaisted et al. | |
| 2007/0144575 A1 * | 6/2007 | Mascolo et al. | 136/246 |
| 2007/0151594 A1 * | 7/2007 | Mascolo et al. | 136/245 |
| 2007/0212935 A1 | 9/2007 | Lenox | |
| 2008/0230047 A1 * | 9/2008 | Shugar et al. | 126/569 |
| 2009/0151775 A1 * | 6/2009 | Pietrzak | 136/251 |
| 2010/0077679 A1 * | 4/2010 | Sagayama | 52/173.3 |
| 2010/0243023 A1 * | 9/2010 | Patton et al. | 136/244 |
| 2010/0269888 A1 * | 10/2010 | Johnston, Jr. | 136/251 |
| 2012/0192422 A1 * | 8/2012 | Lucas et al. | 29/890.033 |
| 2012/0216464 A1 * | 8/2012 | Bonapace | 52/173.1 |

FOREIGN PATENT DOCUMENTS

| | | |
|---|---|---|
| DE | 27 58 067 | 7/1979 |
| DE | 79 13 751 | 8/1982 |
| DE | 203 04 099 | 7/2003 |
| DE | 1020050 12 054 | 3/2005 |
| EP | 0 344 523 | 12/1989 |
| JP | 2002-115374 | 4/2002 |
| JP | 2003-008046 A | 1/2003 |
| JP | 2003-184235 | 7/2003 |
| JP | 2005-064147 | 3/2005 |
| KR | 100915679 B1 | 9/2009 |
| WO | WO-90/12990 A1 | 11/1990 |
| WO | WO-94/00650 | 1/1994 |
| WO | WO-2009/013607 | 1/2009 |
| WO | WO-2009/120923 A2 | 10/2009 |
| WO | WO-2011/014655 A2 | 2/2011 |

OTHER PUBLICATIONS

International Preliminary Report on Patentability for PCT/US2010/043712 DTD Jan. 31, 2012.
International Search Report for PCT/US2010/043712 DTD Oct. 6, 2011.
International Search Report for PCT/US2011/045773 dated Jul. 13, 2012.
MX Office Action dated Mar. 7, 2012.
US Office Action on U.S. Appl. No. 12/056,791 DTD Dec. 9, 2009.
US Office Action on U.S. Appl. No. 12/056,791 DTD Apr. 11, 2012.
US Office Action on U.S. Appl. No. 12/056,791 DTD Jul. 7, 2010.
Chevalier, H.L. and Norton, D.J.; Wind Loads on Solar-Collector Panels and Support Structure; Texas A&M University—Aerospace Engineering Department; Oct. 1979.
Cochran, Leighton S.; Influence of Porosity on the Mean and Peak Wind Loads for Three Concentrator Photovoltaix Arrays; Thesis for the Degree of Master of Science Colorado State University; Fall 1986.
Development of a Flat Roof Integrated Photovoltaic System (SOFREL); Phase 1 Report of the SOFREL R&D project; Mar. 1994.
Farrington, Robert; Building Integrated Photovoltaics; National Renewable Energy Laboratory Technical Monitor; Jan. 1993.
Fuentes, Martin K.; A Simplified Thermal Model for Flat-Plate Photovoltaic Arrays; Sandia Report, May 1987.
Kern, Jr., Edward C.; Low-cost PV Array Mounting for Flat-Roof Buildings; Third International Workshop on Photovoltaics in Buildings, Sep. 1994.
Peterka, J.A. et al.; Mean Wind Forces on Parabolic-Trough Solar Collectors; Sandia National Laboratories—Colorado State University; May 1980.
Report to US Deparment of Energy Office Building Technologies: Building Integrated Photovoltaics (BIVP)—Analysis and US Market Potential; Feb. 1995.
Russell Miles C. and Kern, Jr., Edward C.; PV Array Designes for Flat-Roof Buildings; 1993 IEEE.
Stafford, Byron; Design Considerations and Performance of Maspeth a-Si PV System; 1994 American Institute of Physics.
US Office Action on U.S. Appl. No. 12/056,791 DTD Dec. 28, 2012.
Hersch, Paul; Strawn, Noni; Piekarski, Dick; Cook, Gary: "Photovoltaics for Residential Applications" Technical Information Branch, Solar Energy Research Institute, published Feb. 1984 (23 pages).
Kern, Edward C. Jr. and Russell, Miles C.: "Array Designs for Flat-Roof Buildings" retrieved from 1993.
Kern, Edward C., Jr. and Russell, Miles C.: "Rotating Shadow Band Pyranometer Irradiance Monitoring for Photovoltaic Generation Estimation" from the 22nd IEEE Photovoltaic Specialists Conference-1991 vol. 1, Las Vegas, NV (7 pages).
Written Opinion for PCT/US2011/045773 dated Jan. 29, 2013.
PV Specifications retrieved from the internet by Greg Pearen, Mar. 23, 2001 (11 pages).
Stiebel Eltron GmbH & Co.: KG: "Mount for the installment of Solar Panels" retrieved from German Patent Office, published Aug. 26, 1982 (9 pages).
Toggweiler, Peter, et. al.: Development of a flat-roof integrated photovoltaic system (SOFREL) Zurich, Switzerland, Mar. 1994 (189 pages).
US Notice of Allowance on U.S. Appl. No. 12/056,791 dated Feb. 5, 2014.
"PV Specifications" http://www.pearen.ca/Reference/pv_specs.htm (2001) retrieved on Dec. 4, 2013.
Adrian Radu, et al., "Steady Wind Pressures on Solar Collectors on Flat-Roofed Buildings," Journal of Wind Engineering and Industrial Aerodynamics, 23 (1986) 249-258.
B. Bienkiewicz et al., "Wind Effects on Roof Ballast Pavers," Journal of Structural Division American Society of Civil Engineering Jun. 1987 (34 pages).

(56) References Cited

OTHER PUBLICATIONS

Delmarva Power & Light Company, "Development of a Dispatchable PV Peak Shaving System," Prepared for the US Department of Energy, Oct. 1995.

Edward C. Kern, Jr., et al., "Rotating Shadow Band Pyranometer Irradiance Monitoring for Photovoltaic Generation Estimation," Twenty-second IEEE Photovoltaic Specialist Conference—1991.

H.W. Tielman, et al., "An Investigation of Wind Loads on Solar Collectors," Virginia Polytechnic Institute and State University, Blackburg, VA, 1989.

Installation Guide for the Siemens Solar Industries M55/M75/M65/M20/M45/M40/M35 Solar Electric Modules, 1990.

L.M. Murphy, "Wind Loading on Tracking and Field Mounted Solar Collectors," Solar Energy Research Institute, prepared for US Department of Energy, Dec. 1980.

Lisa Frantzis, et al., "Building-Integrated Photovoltaics (BIPV): Analysis and US Market Potential," Report to US Department of Energy Office of Building Technologies, Feb. 1995.

M.C. Russell, "Solar Photovoltaic Systems for Residences in the Northeast," Prepared for the US Department of Energy, 1980.

Miles C. Russell, et al., "Stand-Off Building Block Systems for Roof-Mounted Photovoltaic Arrays," Sandia National Laboratories, SAND85-7020, Jun. 1986.

International Preliminary Report on Patentability for PCT/US2011/045773 dated Jan. 29, 2013.

S. Bhaduri et al., "Wind Loading on Solar Collectors," SERI, Jun. 1985.

Second Office Action issued Jan. 30, 2013, in Chinese Patent Application No. 200980119302.8.

Solar Energy Research Institute, "Photovoltaics for Residential Applications," SERI, Feb. 1994.

US Notice of Allowance on U.S. Appl. No. 12/056,791 DTD Oct. 28, 2013.

American Society of Civil Engineers, "Minimum Design Loads for Buildings and Other Structures," ANSI/ASCE 7-95, approved Jun. 6, 1996.

\* cited by examiner

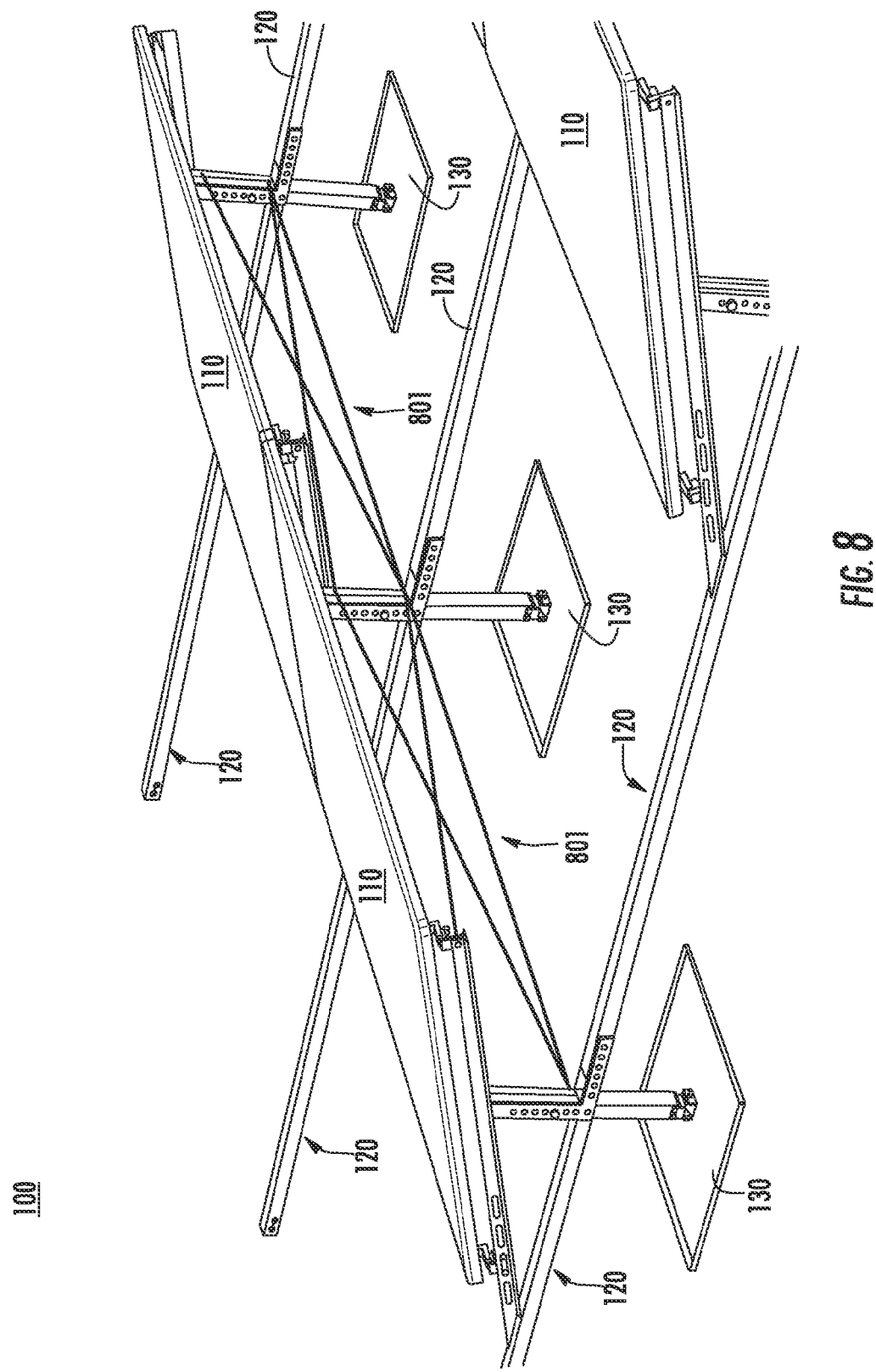

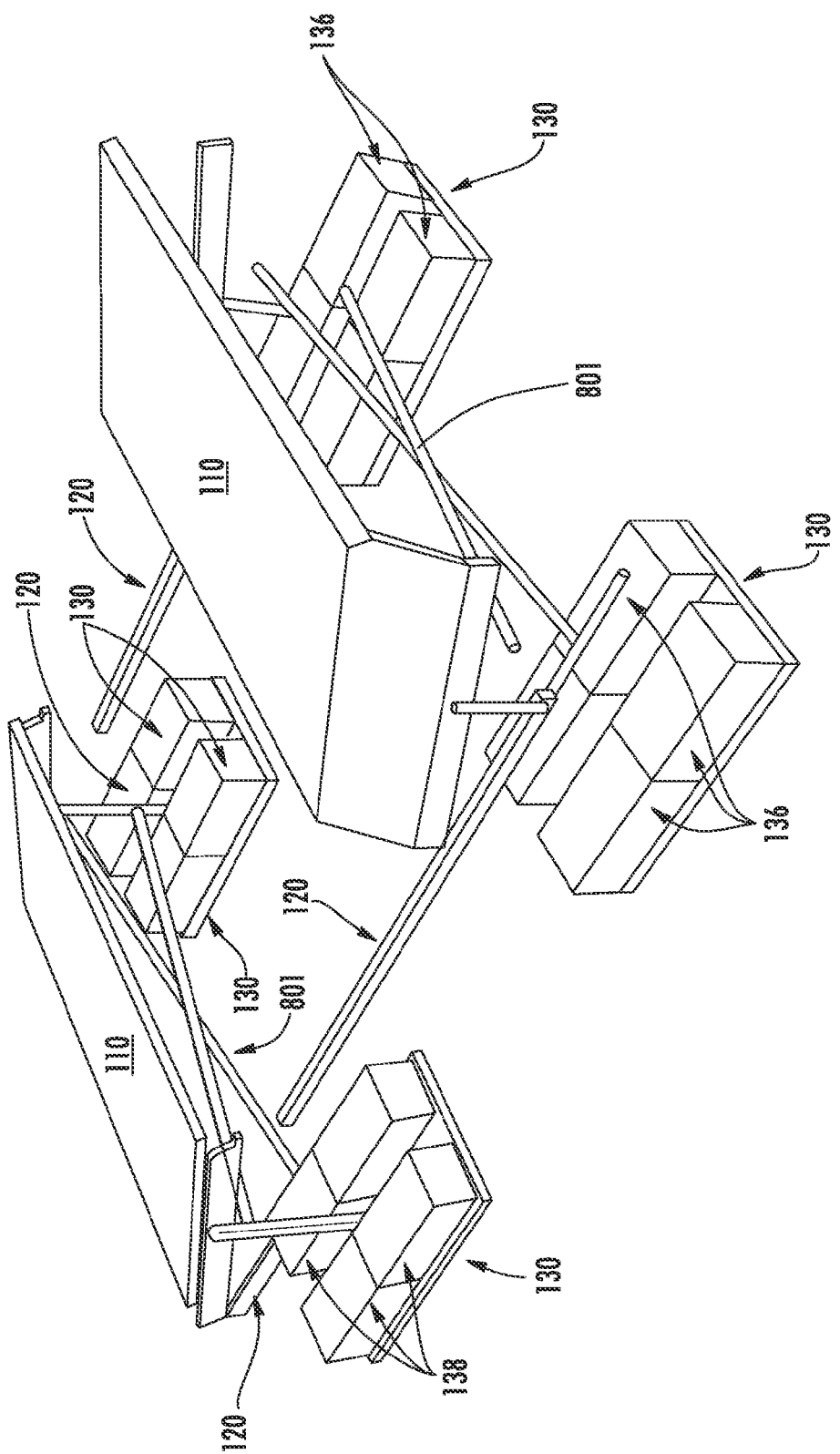

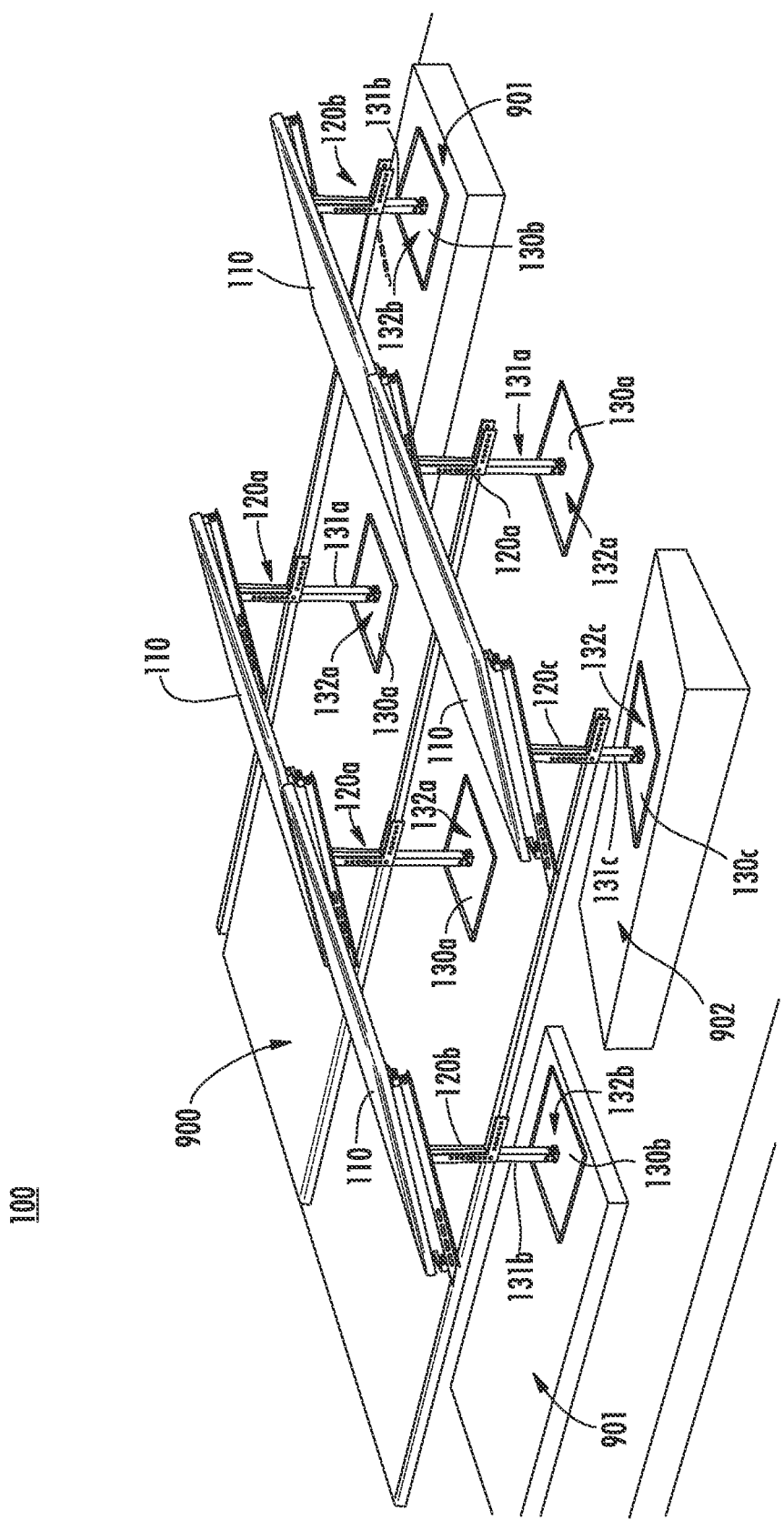

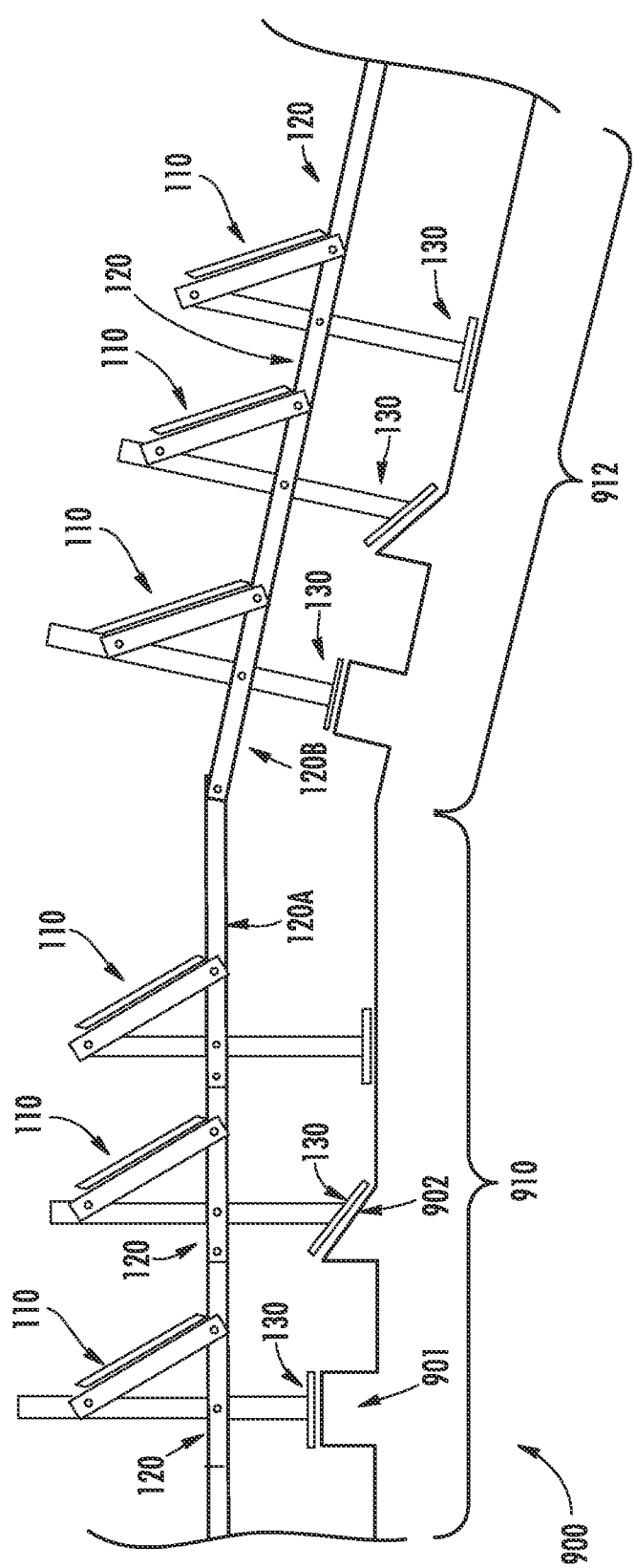

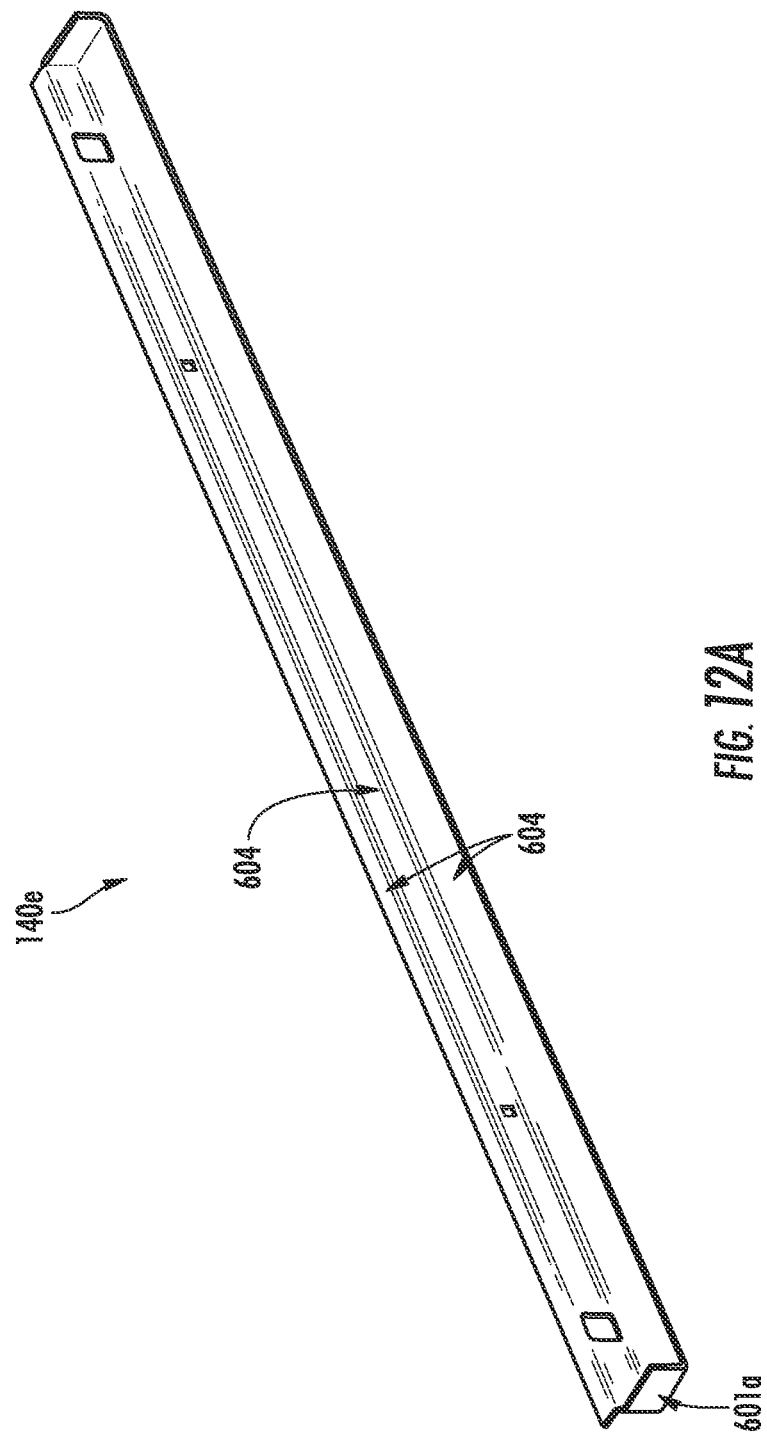

GROUND MOUNTED SOLAR MODULE INTEGRATION SYSTEM

CROSS REFERENCE TO RELATED APPLICATIONS

The current application claims the benefit under of U.S. Provisional Patent Application Ser. No. 61/229,622 filed Jul. 29, 2009, and is a continuation in part of U.S. patent application Ser. No. 12/056,791 filed Mar. 27, 2008, the entire contents of each of which are incorporated herein by reference.

BACKGROUND

Embodiments disclosed herein are directed to systems, devices for use with systems, and methods of mounting and retaining solar panels.

Solar (e.g., photovoltaic) panels are often manufactured in the form of flat rigid structures. To facilitate the performance of the function of generating electricity, solar panels may be mounted in an area exposed to the sun or other source of light. Often, it is desirable to mount solar panels outdoors at an angle from the horizontal so that they will more directly face the sun during peak daylight hours as opposed to panels mounted flat on the ground. In some applications, it may be desirable to mount a number of solar panels together in an array in order to combine the power generation capabilities of the individual panels. In many instances, it may be desirable that mounting systems for solar panel arrays retain the solar panels in place. This may be accomplished by attaching the solar panels to one another in a mounting system and/or by mounting the panels to the mounting system.

For example, U.S. Patent Application Publication No. 2007/0133474 to Mascolo et al. describes a supported solar panel assembly including a solar panel module comprising a solar panel and solar panel module supports including module supports having support surfaces supporting the module, a module registration member engaging the solar panel module to position the solar panel module on the module support, and a mounting element. U.S. Pat. No. 6,534,703 to Dinwoodie describes a solar panel assembly for use on a support surface comprising a base, a solar panel module, a multi-position module support assembly, and a deflector.

SUMMARY

Devices, systems, and techniques are disclosed for mounting and retaining solar panels. In some embodiments, solar panels are mounted in arrays on the ground, e.g. in an open field. In some embodiments, the ground includes local surface undulations, and the array of solar panels may be constructed to compensate for these undulations.

In one aspect, a method is disclosed for installing a solar panel array, the method including acts of: providing a support mechanism including a support post pivotably attached to a support base; selecting an angular orientation of the support post with respect to the support base; setting the selecting an angular orientation of the support post; providing a solar panel; selecting a height on the support mechanism for attaching the panel; and attaching the panel at the selected height.

In another aspect, an apparatus for mounting solar panels is disclosed including: a support mechanism including a support post pivotably attached to a support base and an attachment module for attaching the solar panel to the support mechanism.

In one aspect, a method is disclosed of installing a solar panel array, the method including the steps of: obtaining a first support mechanism including a support post pivotably attached to a support base; selecting an angular orientation of the support post with respect to the support base; setting the selected an angular orientation of the support post; obtaining a first solar panel; selecting a height on the first support mechanism for attaching the first panel; and attaching the first panel to the first support mechanism at the selected height.

In some embodiments, the angular orientation of the support post is selected to compensate for a local undulation in a surface on which the first support mechanism is located.

In some embodiments, the height on the first support mechanism for attaching the panel is selected to compensate for the local undulation in the surface on which the first support mechanism is located.

In some embodiments, attaching the first panel to the first support mechanism includes coupling an attachment module to the first solar panel; and after coupling the attachment module to the first solar panel, coupling the attachment module to the first support mechanism.

In some embodiments, the first support mechanism includes a support frame coupled to the support post. The support frame includes: a first elongated member coupled to the support post and extending from a front end to a rear end along a direction substantially perpendicular to the support post; a second elongated member extending at an angle to the first elongated member between a front end coupled to the front end of the first elongated member and a rear end, the second elongated member include at least one facility adapted to receive the attachment module to couple the solar panel to the support frame; and a facility for adjusting the height of the first elongated member relative to the support base to a selected one of a plurality of heights. The method further including the steps of: selecting a height of the first elongated member relative to the support base; setting the height of the first elongated member relative to the support base to the selected height; and coupling the attachment module to the second elongated member.

In some embodiments, the support frame includes a facility for adjusting the angle of the second elongated member to the first elongated member to a selected one of a plurality of angles. In some embodiments, the method includes: selecting a mounting angle of the solar panel; setting the angle of the second elongated member to the first elongated member to correspond to the mounting angle of the solar panel;

Some embodiments include: obtaining a second solar panel; attaching the second solar panel to the first support mechanism by coupling an attachment module to the second solar panel; and, after coupling the attachment module to the second solar panel, coupling the attachment module to the first support mechanism.

Some embodiments include: obtaining a second support mechanism, the second support mechanism including: a support post pivotably attached to a support base; and a support frame coupled to the support post. The support frame includes a first elongated member coupled the support post and extending from a front end to a rear end along a direction substantially perpendicular to the support post; and a second elongated member extending at an angle to the first elongated member between a front end coupled to the front end of the first elongated member and a rear end, the second elongated member include at least one facility adapted to receive a second attachment module to couple the solar panel to the support frame. In some embodiments, the method includes, for the second support mechanism: selecting an angular orientation of the support post with respect to the support base and selecting a height on the first support mechanism for attaching the first panel, where at least one of the angular orientation of the support post and the height on the first support mechanism for attaching the first panel is selected to compensate for a local undulation in a surface on which the second support mechanism is located; setting the selected angular orientation of the support post; and attaching the first panel to the second support mechanism at the selected height.

Some embodiments include: obtaining a second support mechanism, the second support mechanism including: a support post pivotably attached to a support base; and a support frame coupled to the support post, the support frame including: a first elongated member coupled to the support post and extending from a front end to a rear end along a direction substantially perpendicular to the support post; and a second elongated member extending at an angle to the first elongated member between a front end coupled to the front end of the first elongated member and a rear end, the second elongated member include at least one facility adapted to receive a second attachment module to couple the solar panel to the support frame. In some embodiments, the method includes attaching the front end of the first elongated member of the first support mechanism to the rear end of the first elongated member of the second support mechanism.

In some embodiments, the front end of the first elongated member of the first support mechanism and the rear end of the first elongated member of the second support mechanism are attached using a facility which allows for the relative position and angular orientation of the elongated members to be adjusted. Some embodiments include selecting and setting the relative position and angular orientation of the attached elongated members.

In some embodiments, the relative position or angular orientation of the attached elongated members is adjusted to compensate for a variation in change in a slope of the surface underlying the first and second support mechanisms.

In another aspect, a method is disclosed of installing a solar panel array, the method including the steps of: obtaining a first plurality of solar panels; placing a first plurality of support mechanisms, each including a support post pivotably attached to a support base, on a first region of a surface, the first region having a generally flat portion and localized undulations. In some embodiments, the method includes, for each respective support mechanism in the first plurality: Selecting an angular orientation of the support post with respect to the support base; setting the selected an angular orientation of the support post; selecting an attachment height on the first support mechanism for attaching the first panel; and attaching at least one respective solar panel to the respective support mechanism at the selected height. In some embodiments, the selected angular orientations and the attachment heights are selected to compensate for the local undulations in the first region such that each of the first plurality of panels are positioned with substantially the same orientation relative to the generally flat portion of the surface in the first region.

In some embodiments, the orientation relative to the generally flat portion of the surface in the first region includes a height of the respective panel relative to the generally flat portion of the surface in the first region.

In some embodiments, the panels in the first plurality of panels are each attached to a respective support mechanism while the support mechanism is unattached to any other support mechanisms.

Some embodiments include attaching each support mechanism in the first plurality of support mechanisms to at least one other support mechanism in the first plurality of support mechanisms.

Some embodiments include attaching cross bracing between at least two adjacent support mechanisms in the first plurality of support mechanisms.

In some embodiment's, the support mechanisms in the first plurality are substantially identical.

Some embodiments include: obtaining a second plurality of solar panels; placing a second plurality of support mechanisms, each including a support post pivotably attached to a support base, on a second region of the surface, the first region having a generally flat portion and localized undulations, the second region being adjacent to the first region and having a general slope which differs from a general slope of the first region. Some embodiments include, for each respective support mechanism in the second plurality: selecting an angular orientation of the support post with respect to the support base; setting the selecting an angular orientation of the support post; selecting an attachment height on the first support mechanism for attaching the first panel; and attaching at least one respective solar panel from the second plurality of solar panels to the respective support mechanism at the selected height, where the angular orientations and the attachment heights are selected to compensate for the local undulations in the second region such that each of the second plurality of panels a are positioned with substantially the same orientation relative to the generally flat portion of the surface in the second region.

Some embodiments include attaching at least one of the support mechanisms of the first plurality with at least one support mechanisms in the second plurality.

In some embodiments, for each support mechanisms of the first plurality which is attached to a support mechanism in the second plurality: the support mechanism includes an attachment facility allows for the relative angular orientation of the support members to be adjusted to one of a plurality of orientations. In some embodiments, the method includes attaching the support mechanism includes using the facility to set the relative angular orientation to compensate for the difference in the slopes of the first and second regions.

In some embodiments, the support mechanisms of the first and second pluralities of support mechanisms are substantially identical.

In some embodiments, substantially no portion of each of the support mechanisms in the first plurality is located below the surface.

Some embodiments include driving one or more nails through the at least one of the support mechanisms and the surface to secure the support mechanism to the surface.

In another aspect, a solar panel module mounting system component is disclosed including: support base; a support post; a pivot pivotably coupling the support post to the support base; and a support frame coupled to the support post and including a facility for attaching a solar panel module.

Some embodiments include one or more attachment modules adapted to couple to the solar panel module and to couple to the solar panel module at a selected height and orientation relative to the support base.

In some embodiments, the support frame includes: a first elongated member coupled at a substantially right angle to the support post and extending from a front end to a rear end; a second elongated member extending at an angle to the first elongated member from a front end coupled to the front end of the horizontal member and a rear end, and including the facility for attaching a solar panel module; and a facility for adjusting the height of the first elongated member relative to the support base to a selected one of a plurality of heights.

Some embodiments include a facility for adjusting the angle of the second elongated member to the first elongated member to a selected one of a plurality of angles.

In some embodiments, the pivot is configured to allow the support post to pivot about at least two transverse axes. In some embodiments, the pivot is configured to allow the support post to pivot over at range angles from about 0 to at least about 5 degrees from normal to the support base. In some embodiments, the pivot is configured to allow the support post to pivot over at range angles from 0 to at least 10 degrees from normal to the support base. In some embodiments, the pivot is configured to allow the support post to pivot over at range angles from 0 to at least 30 degrees from normal to the support base.

In some embodiments, the support base includes a base pan for receiving and bearing the weight of a ballast, the base pan configured and arranged to receive the ballast in a position such that the ballast does not interfere with a pivoting motion of the support post.

In some embodiments, the front end of the first elongated member includes a facility for attachment to an adjacent solar panel module mounting system component.

In some embodiments, the facility for attachment of the first elongated member to an adjacent second solar panel module mounting system component is configured to allow adjustment of at least one of the attachment angle and the spacing between the component and the adjacent second solar panel module mounting system component.

Some embodiments consist or consist essentially of the support base; the support post; the pivot; the support frame, the one or more attachment modules, and attachment hardware.

Some embodiments consist or consist essentially of the support base; the support post; the pivot; the support frame, the one or more attachment modules, one or more cross bracing members adapted to extend from the component to an adjacent support component, and attachment hardware. In some embodiments, the attachment hardware consists essentially of nuts, bolts, and screws.

In some embodiments, the support base, pivot, and support post includes a first integral unit; the support frame includes a second integral unit; and the attachment module includes a third integral unit.

In some embodiments, the support base, pivot, and support post and the support frame include a first integral unit; and the attachment module includes a third integral unit.

In some embodiments, when the component deployed on a surface (e.g., the ground), substantially no portion of the component extends through the surface.

In another aspect, a solar panel module mounting system is disclosed including: a first plurality of support mechanisms configured to receive a first plurality of solar panel modules, positioned on a first region of a surface (e.g., the ground), the first region having a generally flat portion and localized undulations, and each support mechanism including: a support base; a support post; a pivot pivotably coupling the support post to the support base allowing the support post to pivot to selected one of a plurality of angular orientations relative to the support base; and a support frame coupled to the support post at a selected one of a plurality of attachment heights relative to the support base, and including a facility for attaching a solar panel module. In some embodiments, for each of the plurality of support mechanisms, the respective selected angular orientation and attachment height compensates for the localized undulations such that each of the first plurality of solar panel modules is positioned with a substantially uniform height above the generally flat portion of the first region.

In some embodiments, each support mechanism is directly coupled to at least one other support mechanism.

In some embodiments, each solar panel module extends between and is supported by a pair of support mechanisms.

In some embodiments, the support mechanisms are substantially identical.

In some embodiments, each support mechanism includes a fixture configured to allow coupling between the support mechanism and another support mechanism and adapted to allow coupling at a selected one of a plurality of relative positions of the coupled mechanisms.

Some embodiments include a second plurality of support mechanisms configured to receive a second plurality of solar panel modules, positioned on a second region of a surface, the second region having a generally flat portion with a slope differing from a slope of the generally flat portion of the first region and localized undulations. In some embodiments, each support mechanism of the second plurality includes: a support base; a support post; a pivot pivotably coupling the support post to the support base allowing the support post to pivot to selected one of a plurality of angular orientations relative to the support base; and a support frame coupled to the support post at a selected one of a plurality of attachment heights relative to the support base, and including a facility for attaching a solar panel module. In some embodiments, for each of the second plurality of support mechanisms, the respective selected angular orientation and height compensates for the localized undulations such that each of the second plurality of solar panel modules is positioned with a substantially uniform height above the generally flat portion of the second region.

In some embodiments, for each support mechanisms of the first plurality which is attached to a support mechanism in the second plurality: the support mechanism includes an attachment facility allowing for the relative angular orientation of the support members to be adjusted to one of a plurality of orientations. In some embodiments, the method includes attaching the support mechanisms includes using the facility to set the relative angular orientation to compensate for the difference in the slopes of the first and second regions.

In some embodiments, the support mechanisms of the first and second pluralities of support mechanisms are substantially identical.

In some embodiments, substantially no portion of each support mechanisms of the first and second pluralities is located below the surface.

Some embodiments include one or more nails extending through the at least one of the support mechanisms and the surface to secure the support mechanism to the surface.

Various embodiments may feature any of the steps, features, and elements described above, alone, or in any suitable combination.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 8 is a rear perspective view of an array of solar panel modules featuring cross bracing;

FIG. 8A is a rear perspective view of an array of solar panel modules featuring cross bracing;

FIG. 9 is a rear perspective view of an array of solar panel modules deployed on undulating ground;

FIG. 9A is a side perspective view of an array of solar panel modules deployed on undulating ground having regions with differing slope;

FIG. 12A is a perspective view of an attachment module of a solar module mounting system;

DETAILED DESCRIPTION

Figure 1:
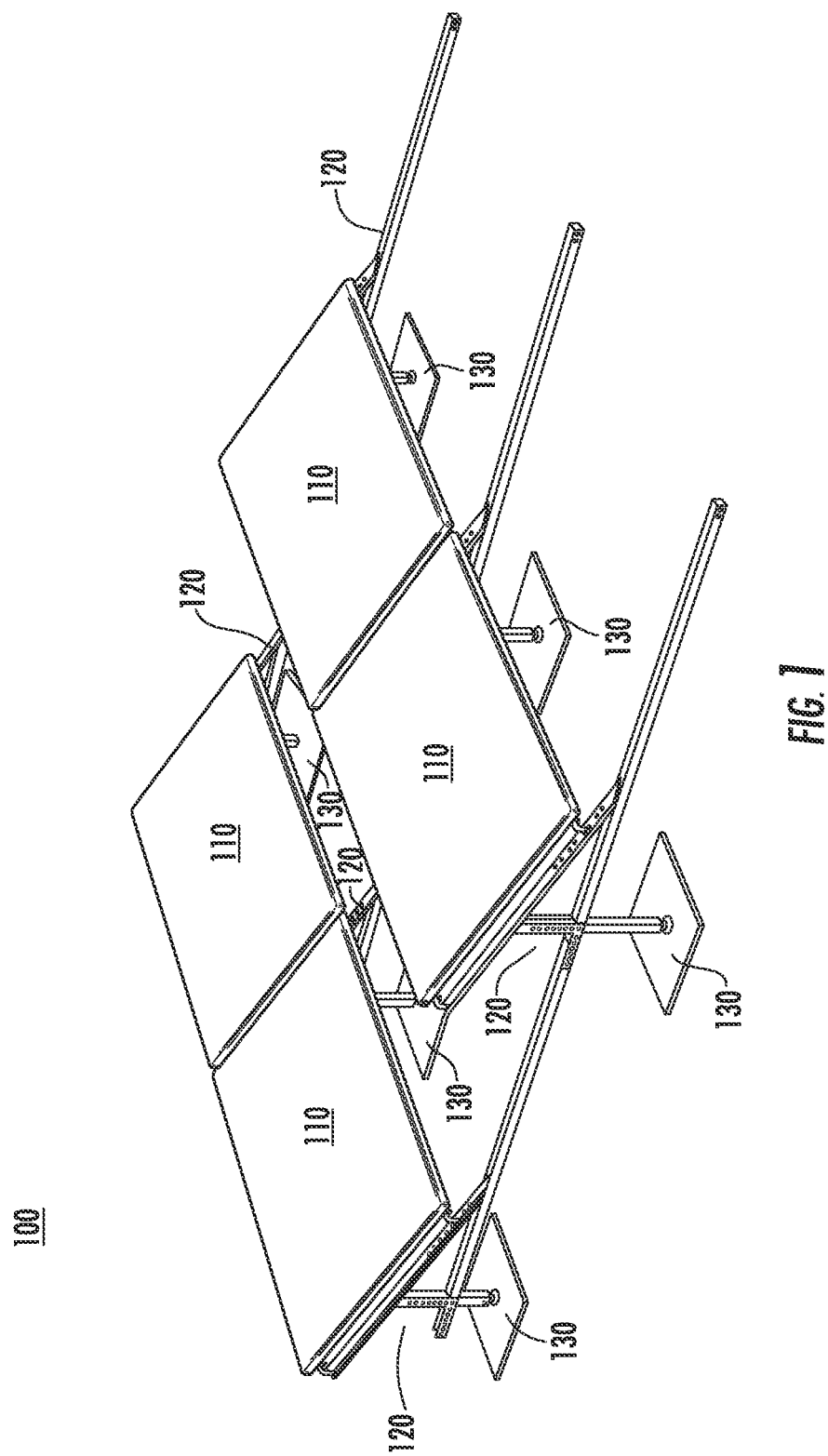
FIG. 1 is an array of solar panel modules.

The embodiments described herein are not limited to the details of construction and the arrangement of components set forth in the following description or illustrated in the drawings. The embodiments are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. The description of one aspect of the embodiments disclosed herein is not intended to be limiting with respect to other aspects of the present embodiments.

FIG. 1 illustrates an example of a section of an array of solar panel modules 100 that may be deployed on a mounting surface, for example, an area of open ground such as a field. Aspects of the present embodiments may be applied to other mounting surfaces, such as roof structures.

The array 100 in this example includes a plurality of solar panel modules 110. In some embodiments, solar panel module 110 is a packaged interconnected assembly of solar cells, e.g., photovoltaic cells. In some embodiments, the solar panel module may be used as a component in a larger photovoltaic system to offer electricity for commercial and residential applications.

The solar panel modules 110 are illustrated in FIG. 1 as being mounted at an angle from the horizontal, but in some embodiments, the solar panel modules may be mounted at angles other than that illustrated in FIG. 1 or even horizontally. The solar panel modules 110 may in some embodiments be mounted at different angles throughout the array 100 and uniformly in others such as the one shown in FIG. 1. The solar panel modules 110 are shown in FIG. 1 facing away from what will be described herein as the Top side of array 100. What is described as the Top side may correspond to geographical North position of the array. As shown here, the Top side may be positioned approximately to the North so that the tilted faces of the panel modules are directed generally toward the South, e.g., tilted to more squarely face the direction of the sun for an installation north of the equator. In some embodiments, deflector elements (not shown) may be mounted facing the lateral sides (i.e., the sides perpendicular to the Top side) at the edges of the array, or in other positions on the array to deflect wind currents.

Solar panel modules 110 in this example are mounted on support frames 120 which are in turn mounted on support bases 130 (sometimes referred to, collectively, as a support mechanism). A support frame is a support structure that may be used to support at least a portion of a solar panel; in this example, each support frame 120 is used to support a side of a solar panel module 110. A support base is a support structure which contacts the ground and supports one or more support frames 120. Examples of support frame 120 and support base 130 are described more fully below.

Note that although a 2×2 array is shown, arrays featuring any other number of solar panel modules 100 arranged in any number of rows and columns may be used. In some embodiments the array is formed with many panels over a large area e.g. and acre, several acres, or more.

Note also that while support frame 120 and support base 130 are shown as separate components, but, in some embodiments, they may be integrated in a single unit.

Figure 2A:
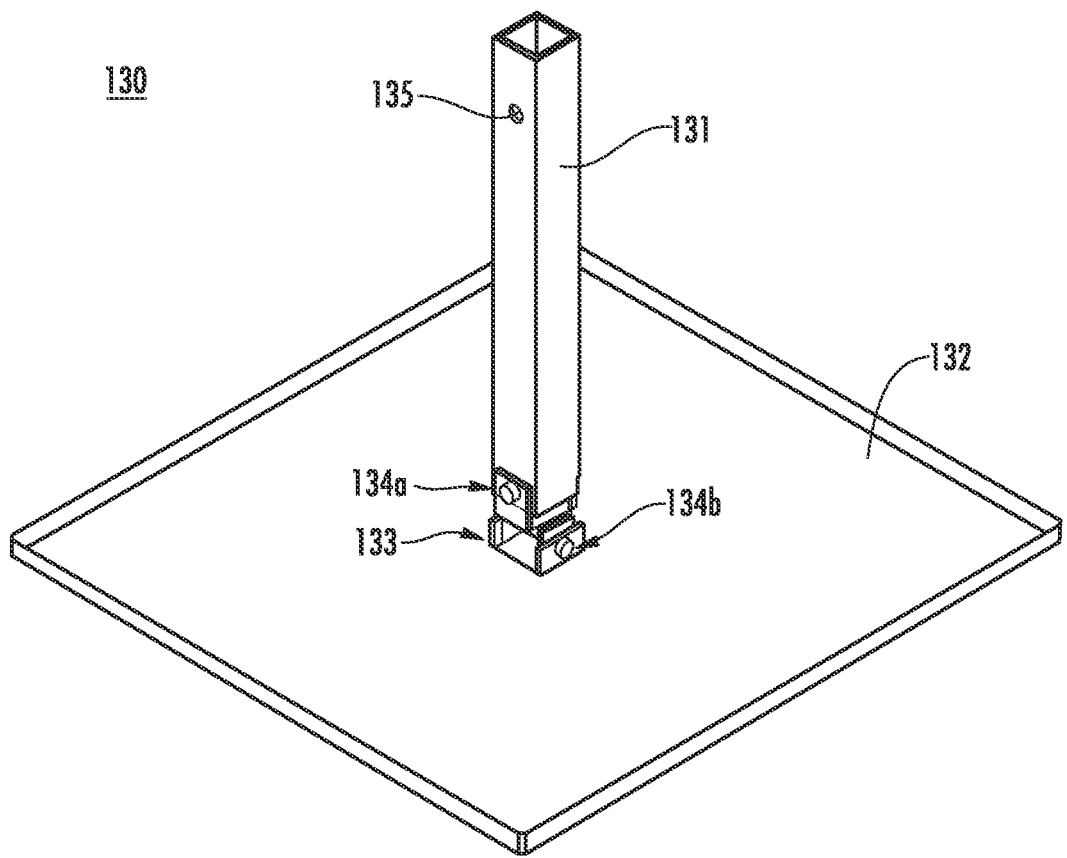
FIG. 2A is a perspective view of a support base.

FIG. 2A is a perspective view of a support base 130. The support base includes a support post 131 connected to a base pan 132. As shown, support post 131 is connected to base pan 132 with a pivot 133. The pivot 133 allows the angle of the support post 131 relative to base pan 132 to be adjusted. Pivot 133 includes two pivot bolts 134a and 134b, allowing post 131 to pivot in two transverse directions. Accordingly, support post 131 may be positioned at a variety of angles. For example, in some embodiments, support post 131 may be positioned at any selected angle in a range less than 30 degrees from normal to base pan 132. Other embodiments may have greater or lesser angular ranges, e.g. angles less than 20 degrees from normal, less than 10 degrees from normal, less than 5 degrees from normal, etc. In various embodiments, any other suitable type of pivot known in the art may be used, including, e.g., a ball and socket joint, a saddle joint, a ball bearing, etc.

The angle of support post 131 may be selected to compensate for local undulations in the ground on which base pan 132 sits. For example, if the ground under base pan 132 had a local tilt of 20 degrees along a given direction, the angle of support post 131 could be adjusted to 20 degrees in the opposite direction, thereby compensating for the local tilt. Once the angle of support post 131 is chosen, pivot bolts 134a and 134b may be tightened to prevent further pivoting thereby setting the angle in place.

Support post 131 includes an attachment mechanism (sometimes referred to as a facility), which in this example is support host bolt hole 135, which may be used to attach post 131 to support frame 120. As described in greater detail below, support post 131 may be attached to support frame 120 at a variety of heights, providing further flexibility to compensate for local undulations in the ground on which base pan 132 sits.

Figure 2B:
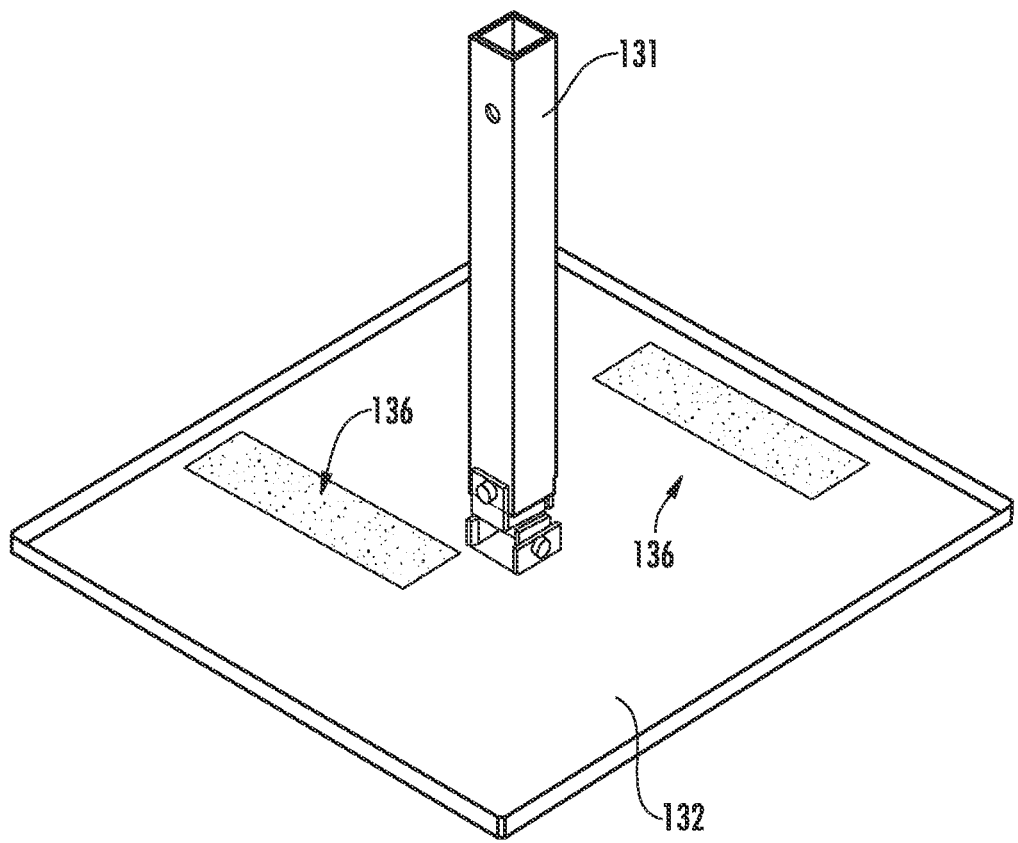
FIG. 2B is a perspective view of a support base with ballast.

As shown in FIG. 2B, ballast 136 may be placed on support pan 132 to provide support base 130 with mass that may assist in keeping array 100 securely in place. In some embodiments, ballast 136 may comprise standard size concrete blocks, such as, for example, blocks with dimensions of 8 inches wide×8 inches tall×16 inches long, which may be available at numerous home improvement and/or building supply stores.

Where the base pans 132 are designed to permit use with standard sized, commercially available blocks, the need to ship heavy ballast elements along with other elements of the system may be reduced (although one could ship the ballast elements or design ballast element specifically for use with base pans 132). A purchaser/installer of the system could purchase or construct the ballast blocks locally.

For example, ballast 136 may include concrete blocks made at or near the site where array 100 is to be positioned. Ballast 136 in some embodiments may be made from any concrete mix that is intended to withstand the elements for an appropriate period of time, such as cement intended for outdoor applications and having an intended life span of 30+ years. Ballast 136 may in some embodiments be made using a Portland Type III concrete with air entertainment of about 5%. This concrete is a high early strength, normal weight concrete with a fully cured strength of 5,000 psi, and is available from Precast Specialties Inc. of Abington, Mass. Alternatively, ballast 136 may be formed from materials such as, for example, rocks, metal, natural or recycled rubber, or Quazite®, a polymer concrete available from Hubbell Lenoir City, Inc. of Lenoir City, Tenn., or other materials.

Although two similarly size ballast elements 136 are illustrated in FIG. 2B, it is to be understood that alternate embodiments may include, for example, left and right and/or front and back ballast elements having different configurations, multiple ballast elements positioned in any suitable configuration, or a single ballast element. If more than two ballast elements are utilized (e.g. as shown in FIG. 8A), these ballast elements may comprise, for example, standard sized building materials, including, for example, standard sized bricks with dimensions of 3⅝ inches wide×2¼ inches high×8 inches long. Other embodiments feature bricks with a of nominal size of 8"×8"×16", although other size blocks may be used. This is a nominal size, typically the true dimensions are smaller in each direction by ⅛-¼". Any other dimensions may be used. If more than two ballast elements are used, they may be mounted on base pan 132 in a stacked or a side-by-side configuration, or both.

As shown, ballast 136 is placed on base pan 132. In some embodiments ballast 136 may be attached or affixed to base pan 132 using any suitable means including fasteners, adhesives, hook and loop materials, etc. Base pan 132 may include a textured surface or retaining features to help maintain the placement of ballast 136.

Additionally, or as an alternative to ballast 136, one or more nails (e.g., 12 inch long nails) may be driven through base pan 132 into the ground below to secure the support base 136. In some embodiments, base pan 132 may include one or more holes, slots, etc. (not shown) to receive the nails and allow the nails to pass through the base pan 132 into the ground.

In some embodiments, support base 130 or any component thereof may also contain one or more wire chases (not shown) that can be used for running electrical wire through the support base 130. Such wire chases may provide integrated wire management (e.g., allowing the electrical interconnection of two or more solar panel modules 110) and integrated grounding capabilities (e.g., accommodating one or more ground wires).

Figure 3:
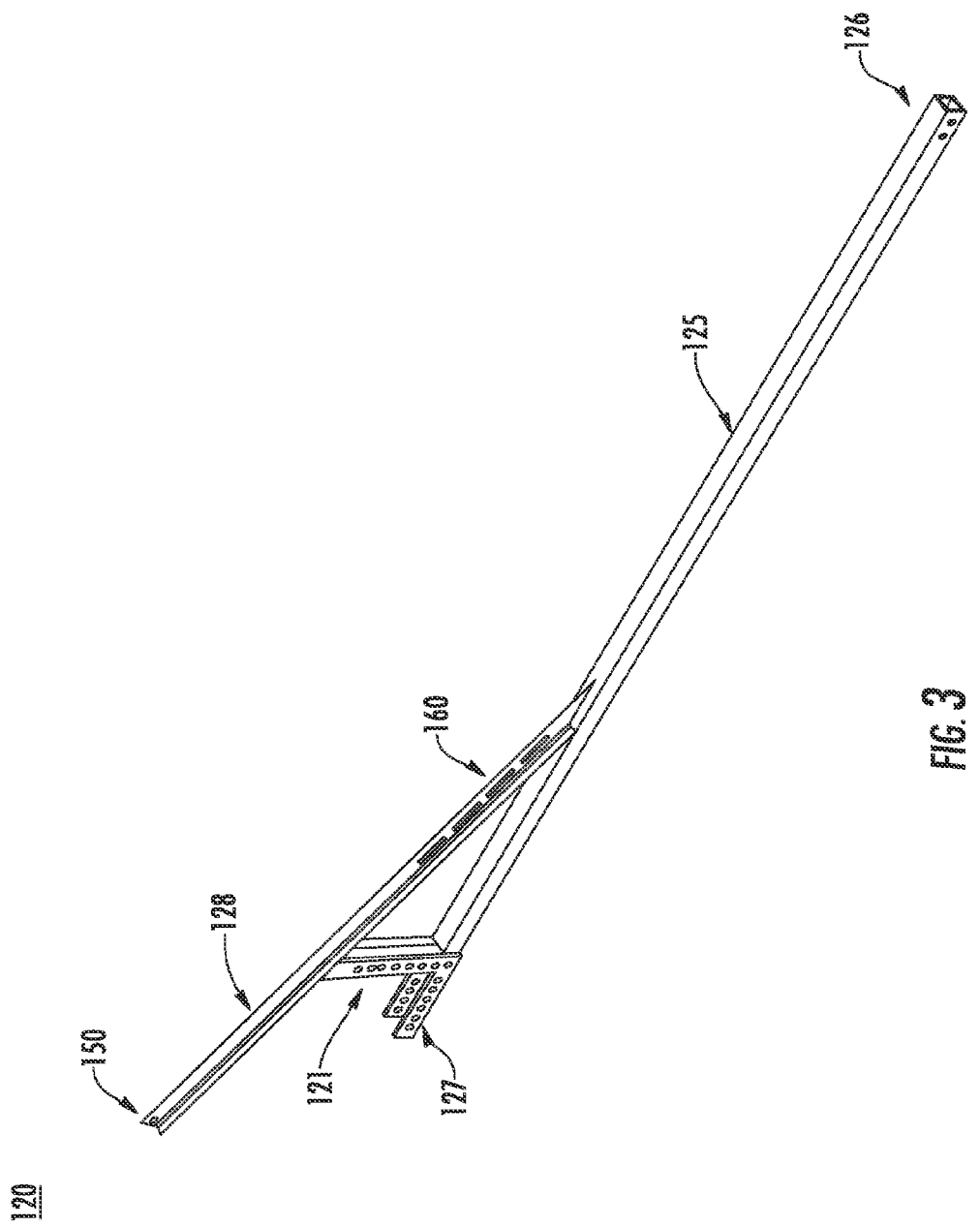
FIG. 3 is a perspective view of a support frame.

Referring to FIG. 3, support frame 120 includes a horizontal member 125. The front end of horizontal member 125 includes a front support frame attachment facility 126. The rear end of horizontal member 125 includes a rear support frame attachment facility 127. As shown in FIG. 1, the front support frame attachment facility 126 of one support frame 120 attaches to rear support frame attachment facility 127 of another support frame 120 to form columns of support frames 120 in array 100.

Rear support frame attachment facility 127 receives the front support frame attachment facility 126 of an adjacent support frame 120. This allows the horizontal members 125 of adjacent support frames to be attached, e.g., in this example, bolted together. The attachment facilities 126 and/or 127 may include multiple horizontally spaced bolt holes, allowing the spacing between support frames (and hence modules 110) to be adjusted as desired. For example, as shown, the rear attachment facility 126 includes six horizontally spaced bolt holes, while the front attachment facility 127 includes two horizontally spaced bolt holes, allowing for twelve possible spacings. Further, support frames 120 may be a pivotably connected, allowing for adjustment of the angle at which horizontal members meet. This allows for construction of an array 100 where the angular orientation of modules 110 may vary row to row. Accordingly, support frames 120 allow for a great deal of flexibility in the positioning of modules 110 in array 100.

Figure 7:
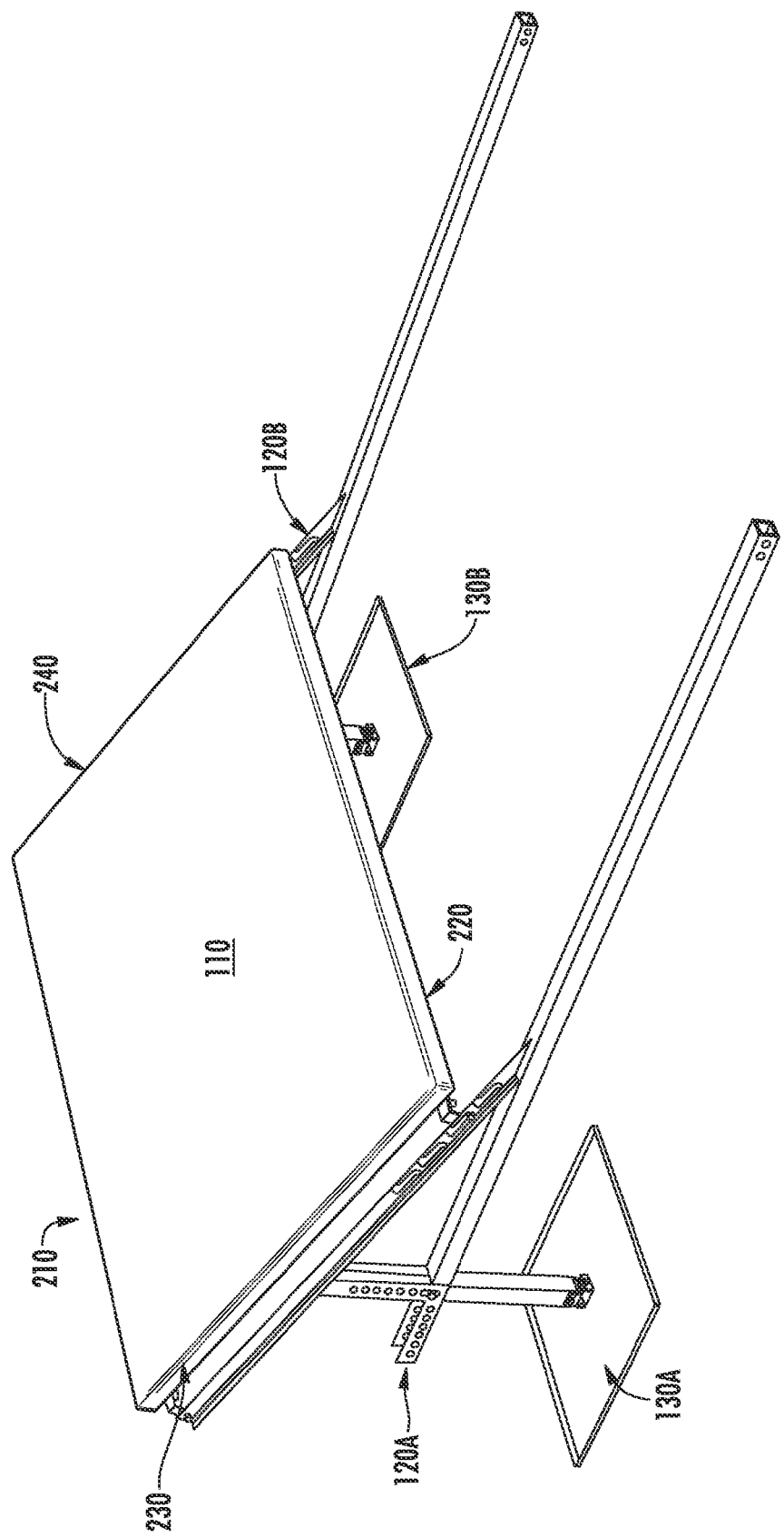
FIG. 7 is a perspective view of a solar panel module mounted to a support frame and support base.

Referring again to FIG. 3, support frame 120 includes angled member 128 which includes a facility to permit attachment of panels to the frame. In this example, rear mounting hole 150 is provided on the rear portion of angled member 128 and provides locations for the attachment of attachment modules 140, described in detail below. In some embodiments, (e.g. as shown in FIG. 7) an attachment module 140 mounted to angled member 128 through rear mounting holes 150 may be attached to a solar panel module 110 proximate a Top edge 210 of the solar panel module 110 that is vertically higher than a Bottom edge 220 of the solar panel module when the solar panel module 110 is mounted on some embodiments of certain aspects of the present embodiments. Some embodiments include a facility which allows for the adjustment of the angular orientation of angled member 128 relative to horizontal member 125. In other embodiments, support frame 120 is constructed as an integral unit, with a fixed orientation of horizontal member 125 and angled member 128.

Figure 4A:
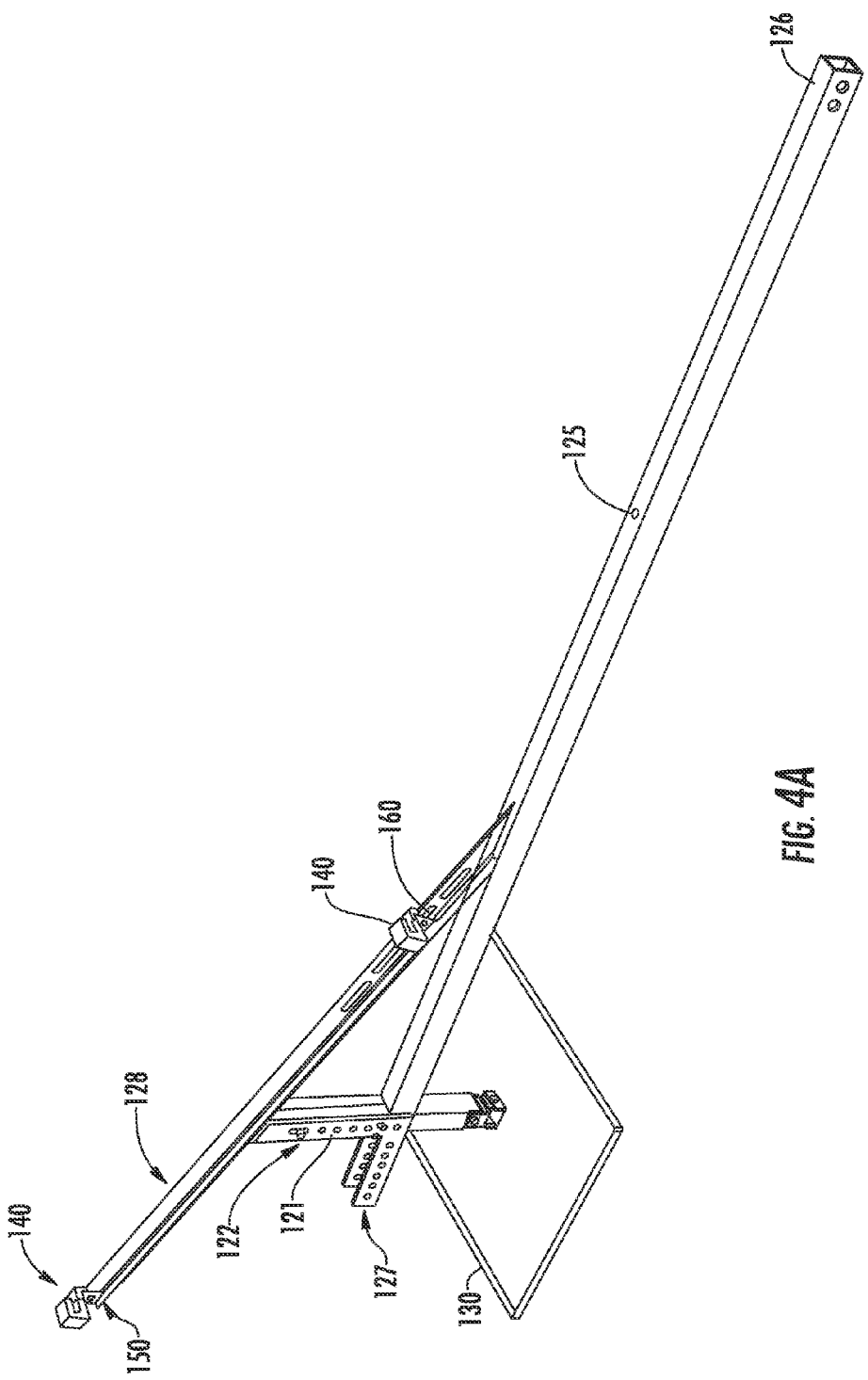
FIG. 4A is perspective view of a support frame mounted on a support base.
Figure 4B:
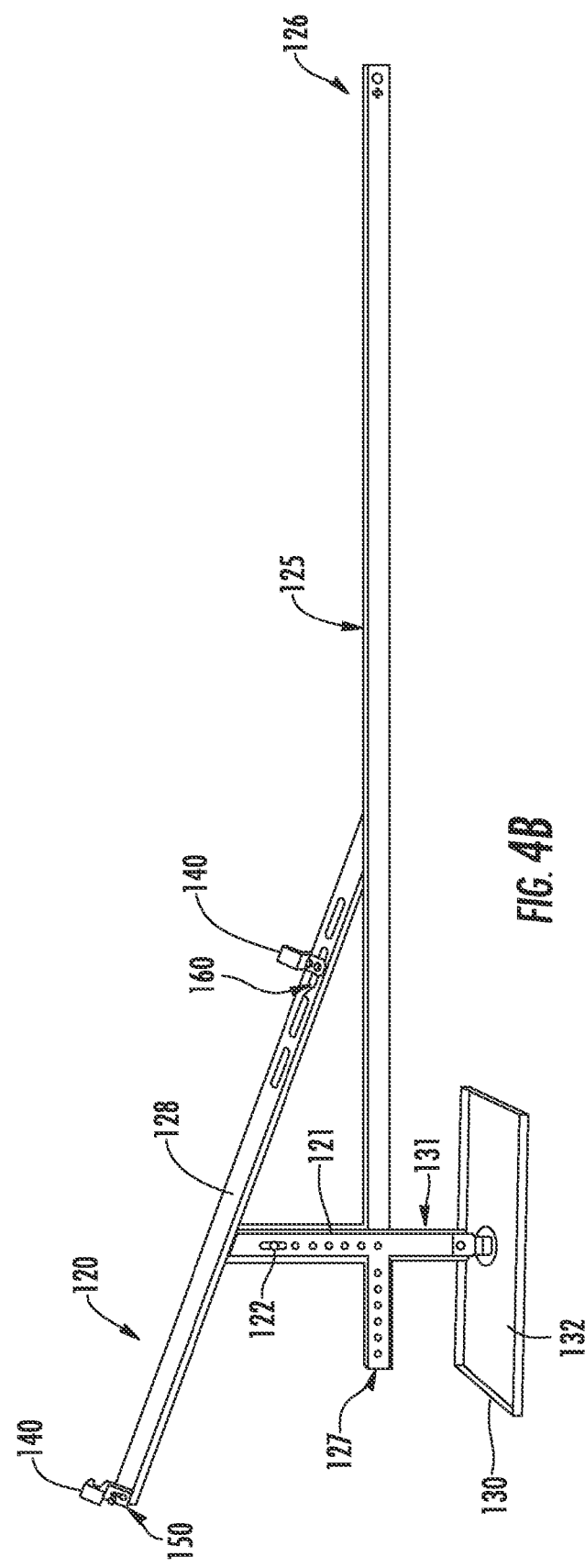
FIG. 4B is a side view of the support frame mounted on a support base of FIG. 4A.
Figure 5:
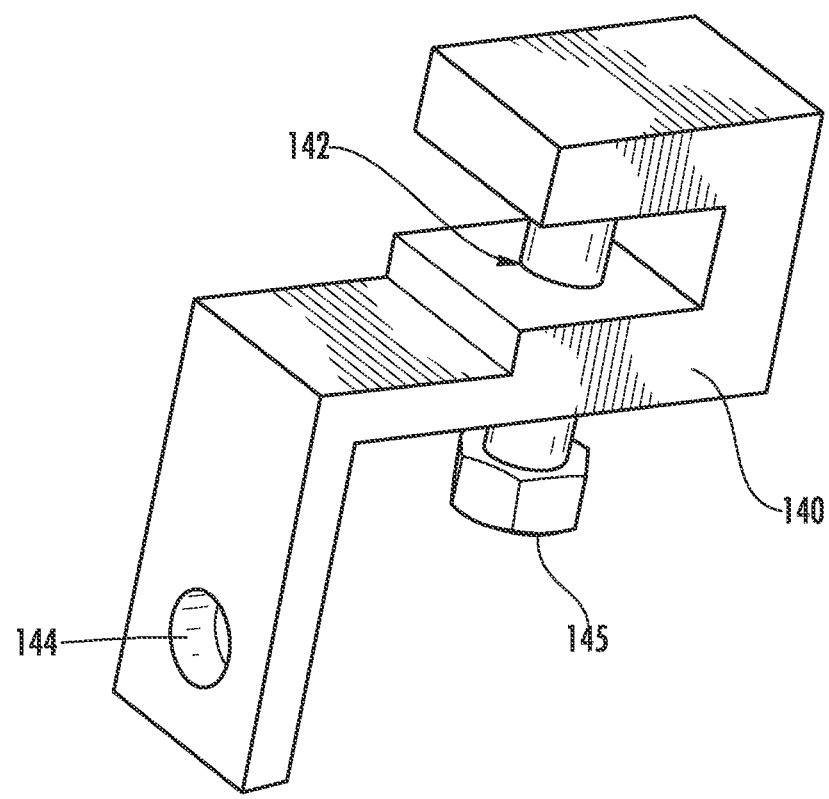
FIG. 5 is an attachment module of a solar module mounting system.

The Bottom edge 220 of solar panel module 110 may be attached with another attachment module 140 to forward mounting slots 160 on angled member 128. Multiple forward mounting slots 160 are provided to allow flexibility in mounting panel modules 110 of various sizes. For example, FIGS. 4A and 4B show a pair of attachment modules 140, a first one attached to mounting holes 150 and second one attached to mounting slots 160 of angled member 128. The distance between the pair of modules 140 may be coarsely adjusted by choosing which mounting slot 160 the second attachment module 140 is mounted to, and more finely adjusted by slidably adjusting the position at which the module is mounted within the slot.

In some embodiments, edges of two solar panel modules 110 may be attached to respective sides of angled member 128 using attachment modules 140. As shown in FIG. 1, this allows solar panel modules 110 to be attached to form the rows of the array 100.

As shown in FIGS. 3, 4A, and 4B, support frame 120 includes a support post attachment mechanism 121 which allows attachment of support frame 120 to support post 131.

As previously noted, this attachment mechanism allows the height of support frame 120 above support pan 132 to be adjusted. As shown, support post attachment mechanism 121 includes several bolt holes spaced apart vertically. Mechanism 121 receives support post 131 and support post 131 is bolted to mechanism 121 with bolt 122 at a desired height using support post bolt hole 135. Alternatively, in some embodiments, support base 130 and support frame 120 may be constructed as an integral unit.

In some embodiments, support frame 120 (or any component thereof) may also contain one or more wire chases (not shown) that can be used for running electrical wire through the support frame 120. Such wire chases may provide integrated wire management and integrated grounding capabilities.

FIG. 4 is an enlarged view of attachment module 140. Attachment module 140 may in some embodiments include a threaded hole 142 and a non-threaded hole 144. In this example, attachment module 140 may be attached to support frame 120 with an appropriate attachment mechanism. In this example a bolt is used to attach attachment module 140 to support frame 120. In other embodiments, a metal pin or a clip may be used, or other attachment devices or mechanisms as would be apparent to one of skill in the art based on the disclosure provided herein.

Attachment module 140 may in some embodiments be made from 6061-T6 aluminum which can be anodized if desired. The attachment module 140 can also be made from other metal or some other material of sufficient strength. Where a conductive material is selected, the attachment module may be used to assist in passing ground among panels. The attachment module may be formed by machine cutting, but can also be extruded, laser cut, or water jet cut or formed using another suitable manufacturing method.

Figure 6A:
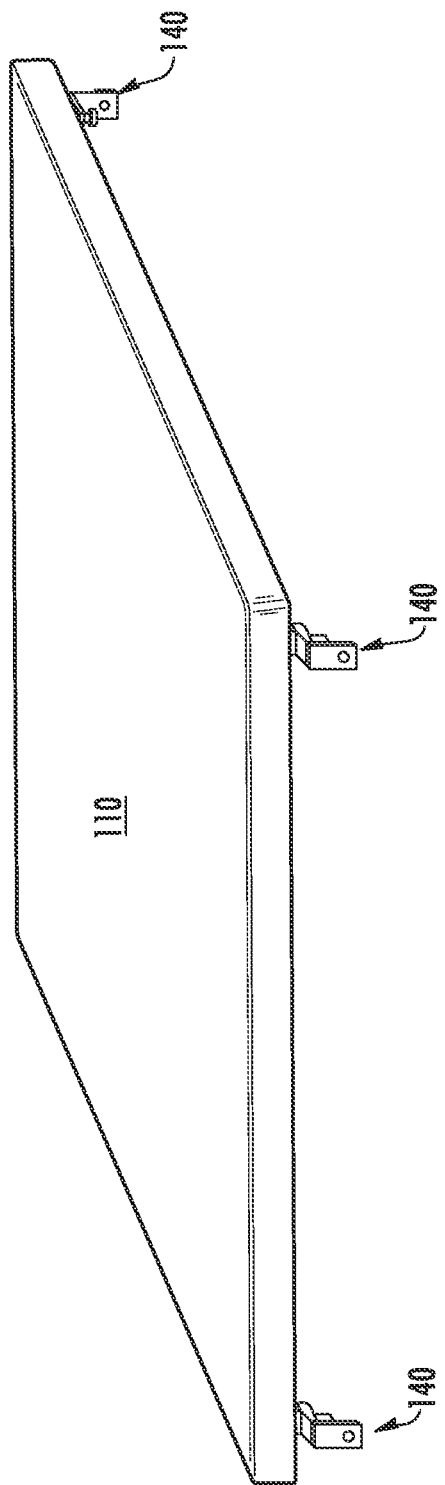
FIG. 6A is a perspective view of the top side of a solar panel module illustrating attachment modules mounted on the solar panel module.

FIG. 6A illustrates one embodiment of attachment module 140 according to one aspect of the present embodiments, mounted proximate the corners of solar panel module 110. In this example the attachment modules 140 may be made of a metal such as aluminum. In some embodiments, the attachment modules 140 may be made of a conductive material to assist in grounding of the panel modules or may include a grounding path.

Referring back to FIG. 4, attachment module 140 includes an attachment mechanism which in this example is a threaded hole for a bolt which may be used to attach the attachment modules 140 to a solar panel module 110. The attachment module 140 may also include second, non-threaded holes for bolts 145 that may used to attach (or facilitate attaching) an attachment module 140 to support frame 120 (e.g. at rear mounting hole 150 or front mounting slot 160 of angled member 128). Other attachment mechanisms may be employed with attachment modules 140, including, for example, screws, adhesives, clips, or solder.

Since many commercially available solar panels include a similar edge, this particular attachment module is compatible for use with solar panels provided by multiple suppliers. This particular attachment module is also compatible for use with solar panel mounting systems provided by multiple suppliers. Other designs for compatibility with multiple suppliers may be provided based on the disclosure provided herein and different attachment modules may be designed for use with different solar panels but made compatible for use with a common support frame configuration.

Other mechanisms may be employed in other embodiments to facilitate attachment of panel to support frame and those embodiments may (or may not) provide flexibility in ability to vary the height of attachment with respect to the frame by allowing multiple attachment points or by allowing slidable adjustment, as would be readily designed by one of skill in the art based on the disclosure provided herein.

In one embodiment, attachment module 140 is configured to permit it to be attached to a plurality of different panel modules and/or panel module mounting systems available in the market.

Figure 6B:
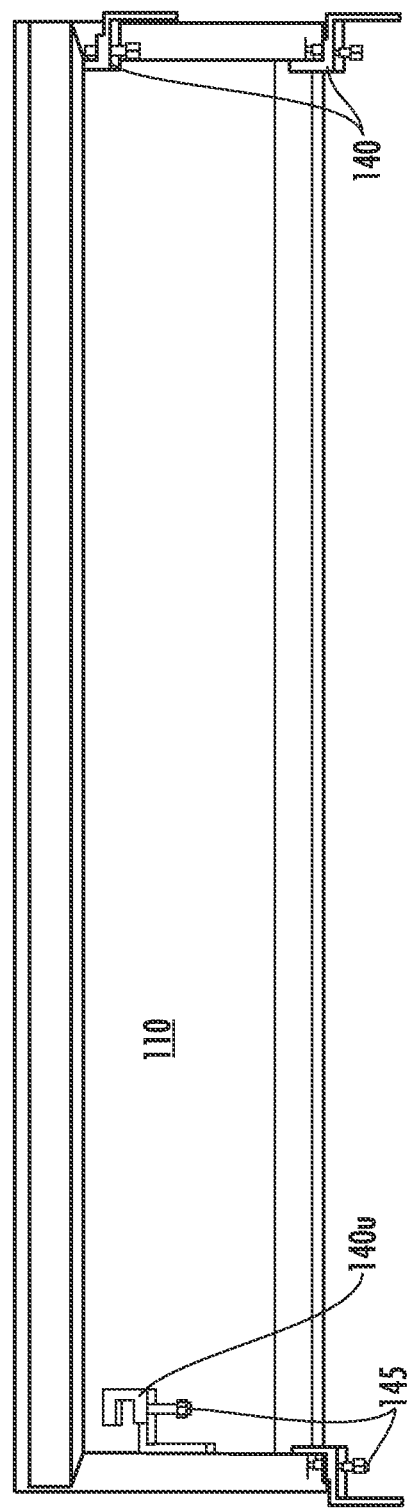
FIG. 6B is a view from the rear underside of a solar panel module illustrating attachment modules mounted on the solar panel module.
Figure 6C:
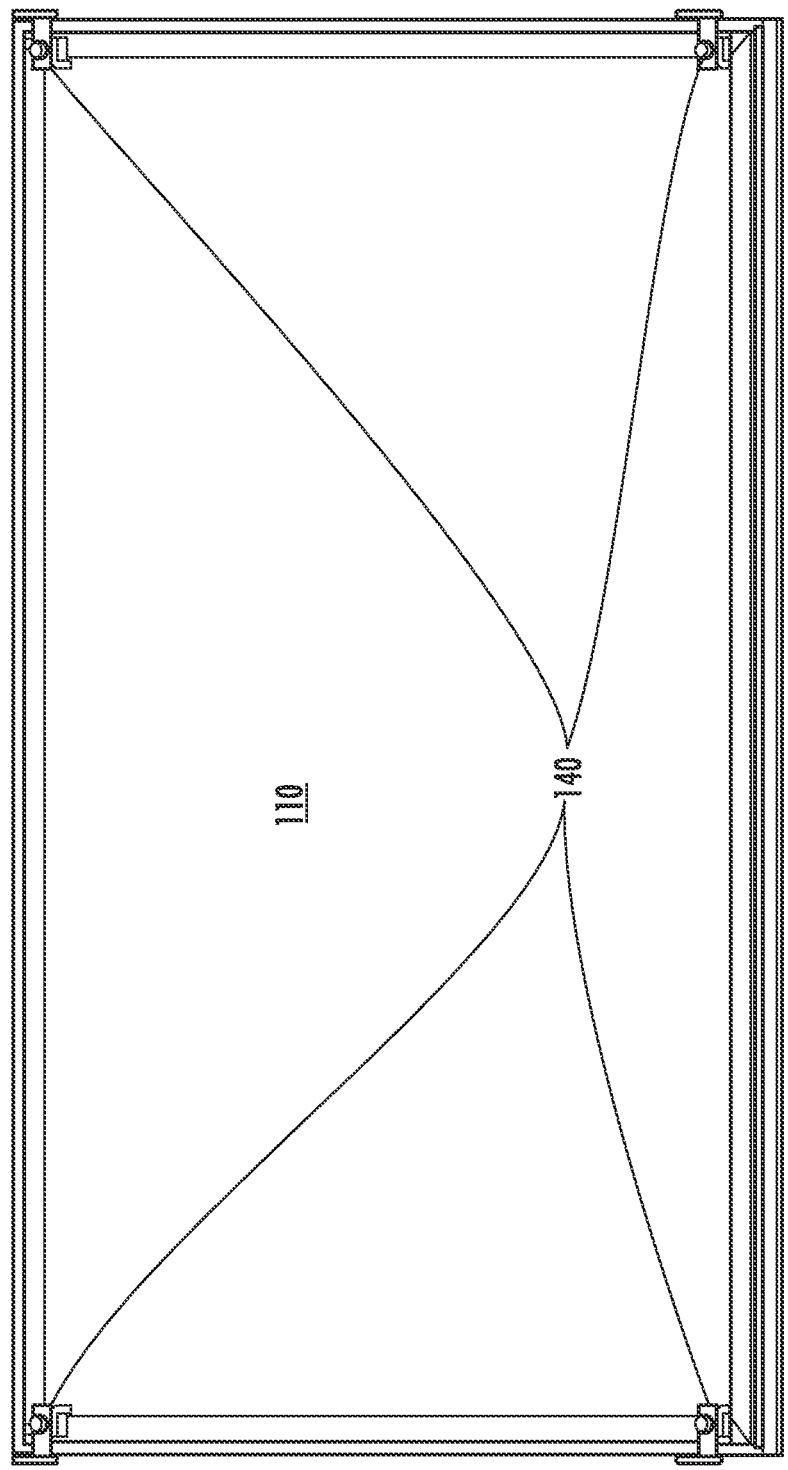
FIG. 6C is a view from underneath a solar panel module illustrating attachment modules mounted on the solar panel module according to an aspect of the present inventions.

FIGS. 6A-6C illustrate one example of how attachment modules 140 may be utilized to attach solar panel modules 110 to support frame 120. FIG. 6B illustrates a solar panel module with three attachment modules 140 attached and one attachment module 140 unattached. As illustrated in FIGS. 6A-6C an attachment module 140 may be attached to a solar panel module 110 by a threaded bolt 145 passing through a threaded hole in attachment module 140 to secure attachment module 140 to an inner edge of solar panel module 110. This provides for positioning and alignment of solar panel module 110 relative to support frame 128. Attachment modules 140 may be attached through non-threaded holes or slots to support frame 120 by bolts passing through one of rear mounting hole 150 and forward mounting slots 160 for a rear and a forward attachment module 140 respectively. In this manner, solar panel modules 110 may be secured in place relative to support frame 120 and relative to one another in a fashion compatible with a number of commercially available solar panels. Other configurations may be designed to permit compatibility with multiple panel types whether attaching at this portion of the solar panel or designed for integration with future solar panels, based on the disclosure provided herein.

FIG. 7 shows a solar panel module 110 with a first lateral edge 230 and a second lateral edge 240 attached to first and second support frames 120A and 120B, respectively. The assembly shown in FIG. 7 can be considered to be a basic unit which may be repeated as shown in FIG. 1 to form the array 100.

FIG. 8 shows a rear view of the array 100 of FIG. 1. Cross bracing 801 provides additional support for solar panel modules 110. As shown, the cross bracing includes three bracing members which extend horizontally between adjacent columns of support frames 120. However, in various embodiments, any other suitable cross bracing or mechanical support members may be used. For example the embodiment in FIG. 8A included only two cross bracing members extending between adjacent pairs of support frames 120a and 120b.

FIG. 9 is a rear perspective view of the array 100 deployed on undulating ground. As shown, the ground 900 is generally flat and level, but includes local portions 901 having deviating heights and portion 902 which has a deviating height and tilt angle.

Array 100 has been adjusted to compensate for the undulation in the ground, such that the height and tilt angle of panels 110 of array 100 are fixed relative to the flat and level portion of round 900 across the entire array.

Three support bases 130a are a positioned on the flat level portion or the ground. For these support bases 130a, support posts 131a are oriented normal to their respective base pans 132a and are attached to their respective support frame 120a at equal heights.

Two support bases 130b are positioned on portions 901 of ground 900 which are level, but have heights which deviate from the flat and level portion of ground 900. For these support bases 130b, support posts 131b are also oriented normal to their respective base pans 132b. However, they are attached to their respective support frames 120b at heights which compensate for the local height deviation.

One support base 130c is positioned on portion 902 of ground 900 which has both a height and a tilt angle which deviates from the flat and level portion of ground 900. For the support base 130c, support post 131c is oriented at an angle from normal to its respective base pan 132b, to compensate for the tilt of portion 902. Support post 131c is also attached to its respective support frame 120b at a height which compensates for the local height deviation of portion 902.

Other adjustments to compensate for various configurations of undulating ground may be provided based on the disclosure provided herein. For example, ground 900 may be generally flat and inclined, with local undulations. In such a case, array 100 may be adjusted to compensate for the undulation in the ground, such that the height and tilt angle of panels 110 of array 100 are fixed relative to the flat and inclined portion of ground 900 across the entire array (or portions thereof).

In some cases, as shown in FIG. 9A, ground 900 may include a first region 910 and a second region 912 which are both generally flat with local undulations, but which are inclined at different slopes. As shown, because support frames 120a and 120b may be pivotally connected (as discussed in detail above), the array can accommodate the regions of ground having varying slope. Note that although two regions of varying slope are shown, and number may be accommodated. Accordingly, array 100 may be easily installed over large areas of terrain without the need for specially constructed parts (i.e., support frames 120 in array 100 may be all identical or substantially identical components.)

In general, the devices and techniques described herein allow ground mounted solar panel module support arrays to be designed and constructed with ease and flexibility. Local undulations may be compensated for, and various suitable row and column spacings and angular orientations may be used.

Support frame 120, support base 130 can be made from metals (such as stainless steel, mild steel, aluminum, etc), UV resistant plastic, fiberglass, concrete, or other materials.

In some embodiments, one or more of base pans 132 may include a pad or sole on its underside. The sole may be made from any suitable material, e.g. a textured material which improved the grip of base pans 132 on the supporting surface. In cases where base pans 132 are not placed on the ground but, e.g. on a roof surface, material that can be considered an "inert pad" by the roofing industry may be used. In some embodiments, the sole may be made from recycled, non-vulcanized crumb rubber, such as that available from Unity Creations Ltd. of Hicksville, N.Y. In other embodiments the sole may be made from natural rubber, EPDM (Ethylene Propylene Diene Monomer—a rubber roofing material), or another roofing material that may protect the roof or other surface upon which array 100 may be mounted from damage. The sole may be attached to the underside of base pan 132 using any suitable attachment, e.g. adhesive, fasteners, etc.

Figure 10A:
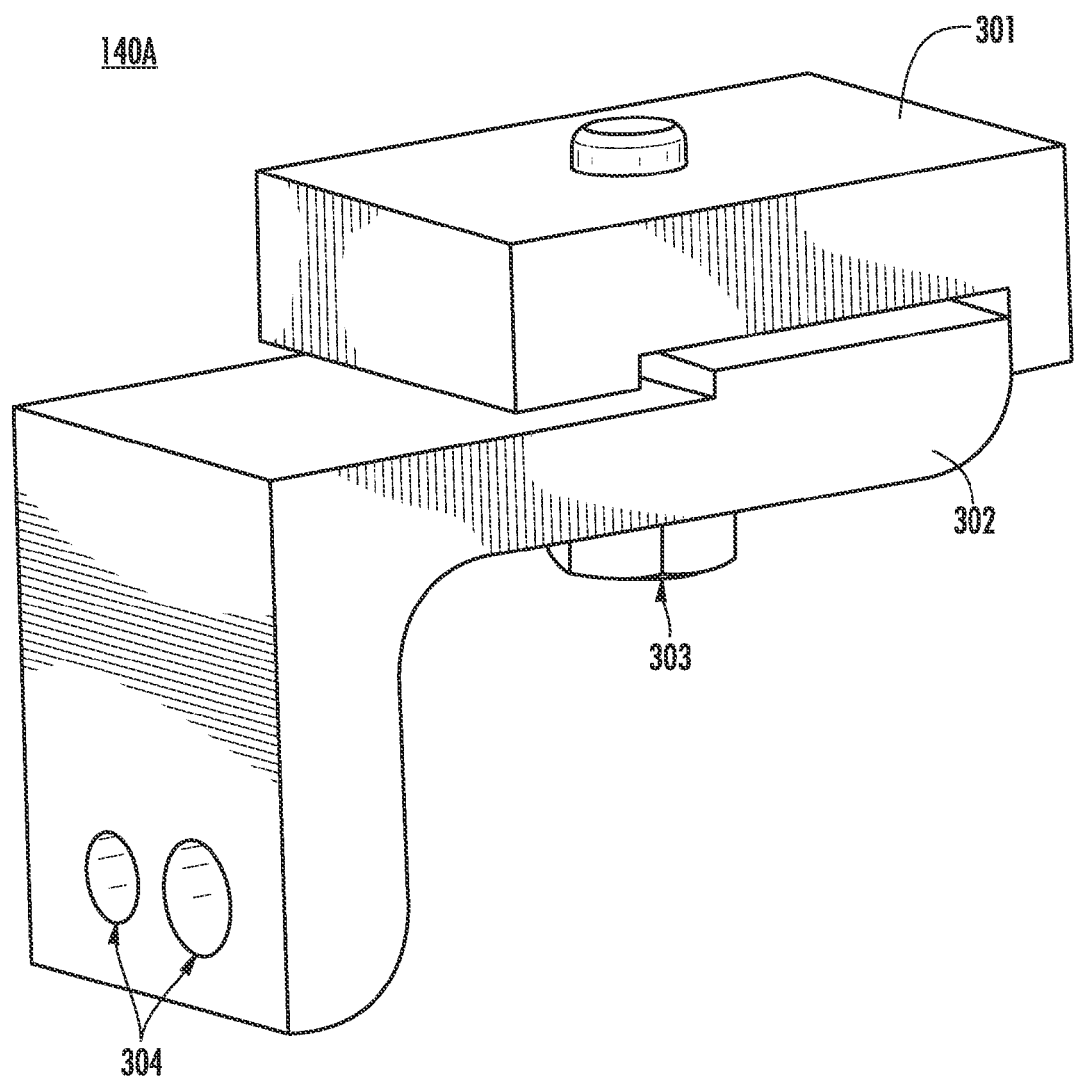
FIGS. 10A-10D are perspective views of attachment modules of a solar panel module mounting system.

FIGS. 10A-10D show alternative embodiments of attachment module 140. Referring to FIG. 10A, attachment module 140a includes upper member 301 and lower member 302. An inner edge of panel 110 (not shown) can be attached between the upper and lower members. The inner edge may include a hole (e.g. a pre-formed hole provided by the panel manufacturer). Threaded bolt 303 can pass through a threaded bolt hole in the lower member, through the hole in the inner edge, and into a threaded bolt hole in upper member 301. Holes 304 in lower member 302 may be used to attach the attachment module 140a to support frame 120, e.g. using an attachment bolt.

Figure 10B:
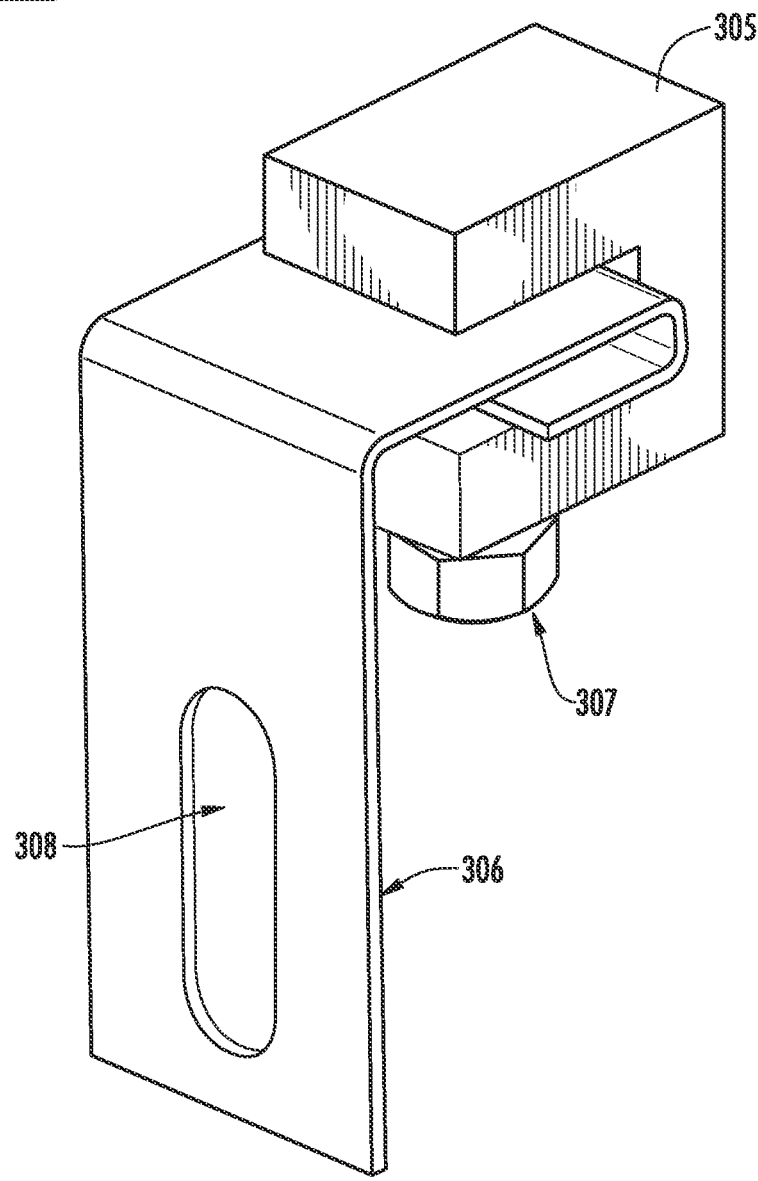

Referring to FIG. 10B, attachment module 140b includes a c-shaped member 305 and a flat angled member 306. An inner edge of panel 110 (not shown) can be attached between the members 305 and 306. Threaded bolt 307 may pass through a threaded bolt hole in the c-shaped member to clamp the inner edge between members 305 and 306. Slot 308 in flat angled member 306 may be used to attach the attachment module 140a to support frame 120, e.g. using an attachment bolt.

Figure 10C:
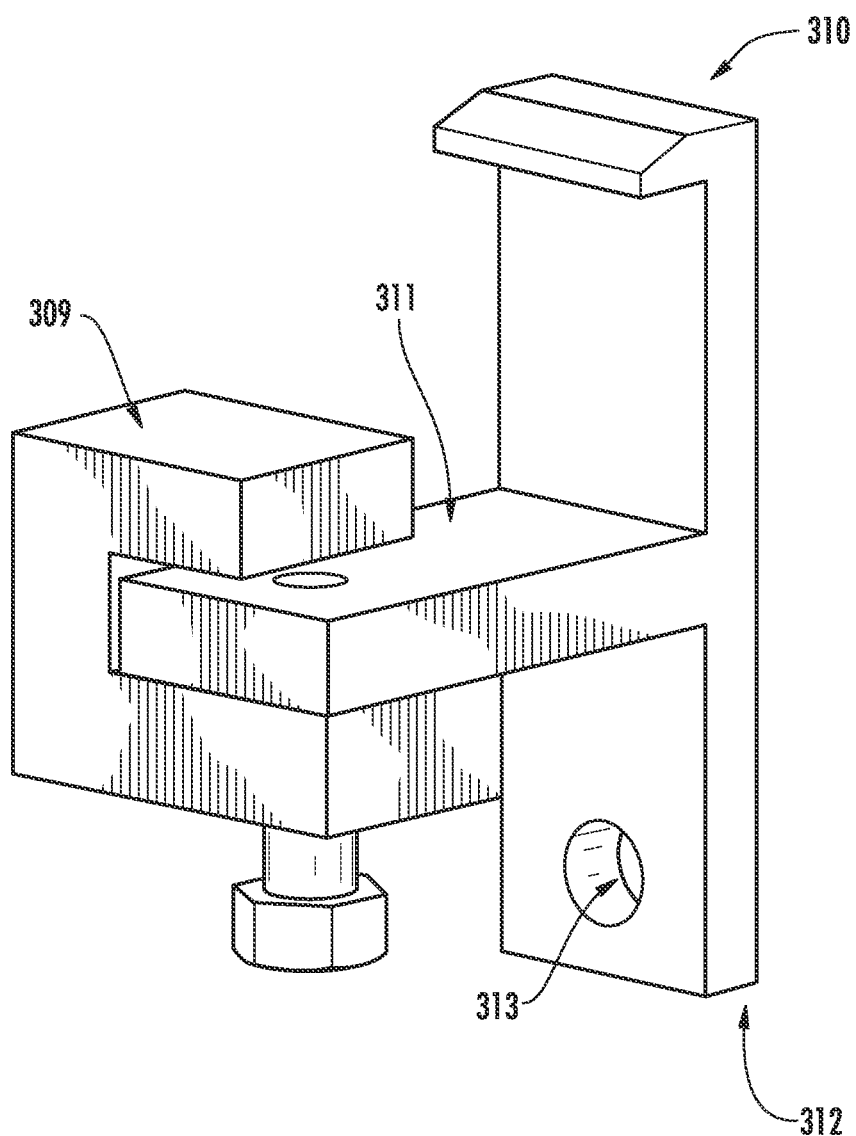

Referring to FIG. 10C, attachment module 140c may be used for attachment to a panel module 110 which lacks an inner edge along its lateral side, but includes an inner edge along its Top or Bottom side. Attachment module 140a allows for the panels of this type to be mounted to support frames 120 of the type shown in FIG. 1 without additional modification.

Attachment module 104c includes a c-shaped member 309 and an extension member 310. A Top or Bottom inner edge of panel 110 (not shown) can be attached between the c-shaped member 309, and portion 311 of attachment member 310. Threaded bolt 307 may pass through a threaded bolt hole in the c-shaped member to clamp the inner edge between members 305 and 306.

Attachment module 140c may be attached to panel module 110 proximal to a corner of the panel, such that portion 312 of extension member 310 extends out past the lateral side of the panel for mounting to support frame 120. Hole 313 in attachment member 310 may be used to attach the attachment module 140c to support frame 120, e.g. using an attachment bolt. Note that although exemplary dimensions are provided in the figure, any suitable dimensions may be used.

Figure 10D:
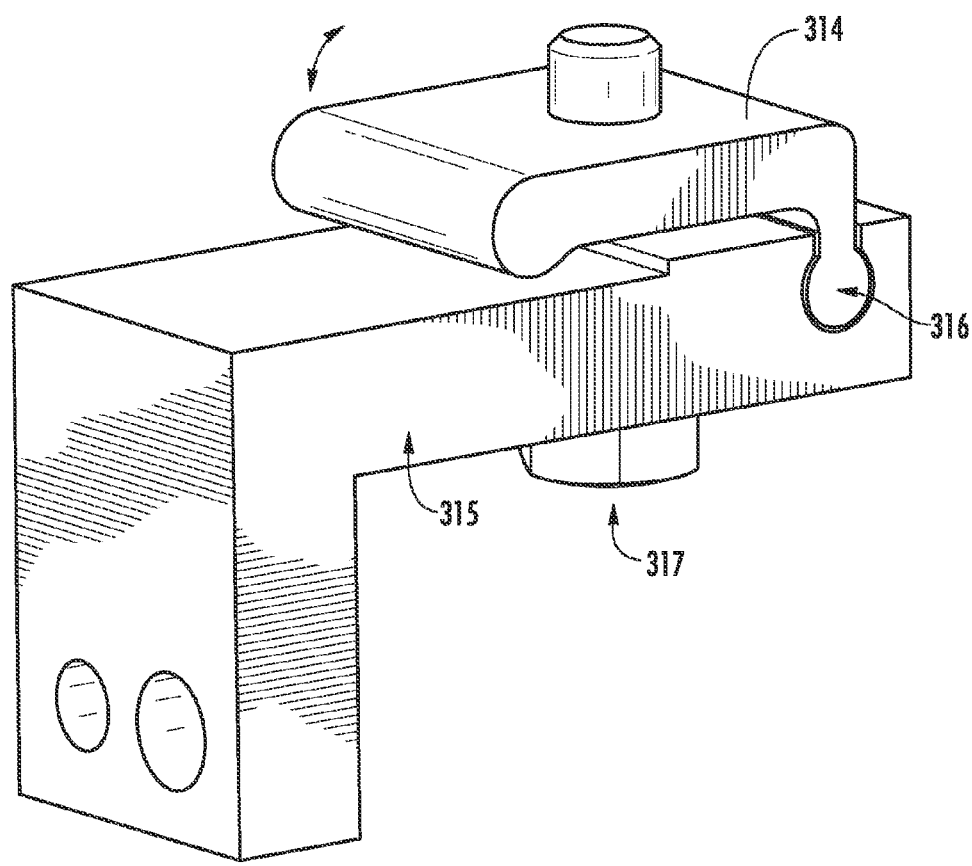

Referring to FIG. 10D, attachment module 140d includes upper member 301 and lower member 304. The members are connected by at pivot 316, thereby forming "jaws" that can open and close. An inner edge of panel 110 (not shown) can be attached between the jaws formed by members 314 and 315. The pivoting of the jaws allows attachment module 140d to attach to inner edges having a variety of shapes and sizes, including irregular shapes. Thus, attachment module 140d may be compatible with multiple types of panels, and/or with panels of a single type which (e.g. due to manufacturing errors) have inner edges of varying shape or size.

In cases where the inner edge includes a hole (e.g. a pre-formed hole provided by the panel manufacturer), Threaded bolt 317 can pass through a threaded bolt hole in the lower member, through the hole in the inner edge, and into a threaded bolt hole in upper member 301. In cases where the inner edge does not include a hole, threaded bolt 317 can be used to clamp the edge in place. Holes 304 in lower member 302 may be used to attach the attachment module 140a to support frame 120, e.g. using an attachment bolt.

Figure 12B:
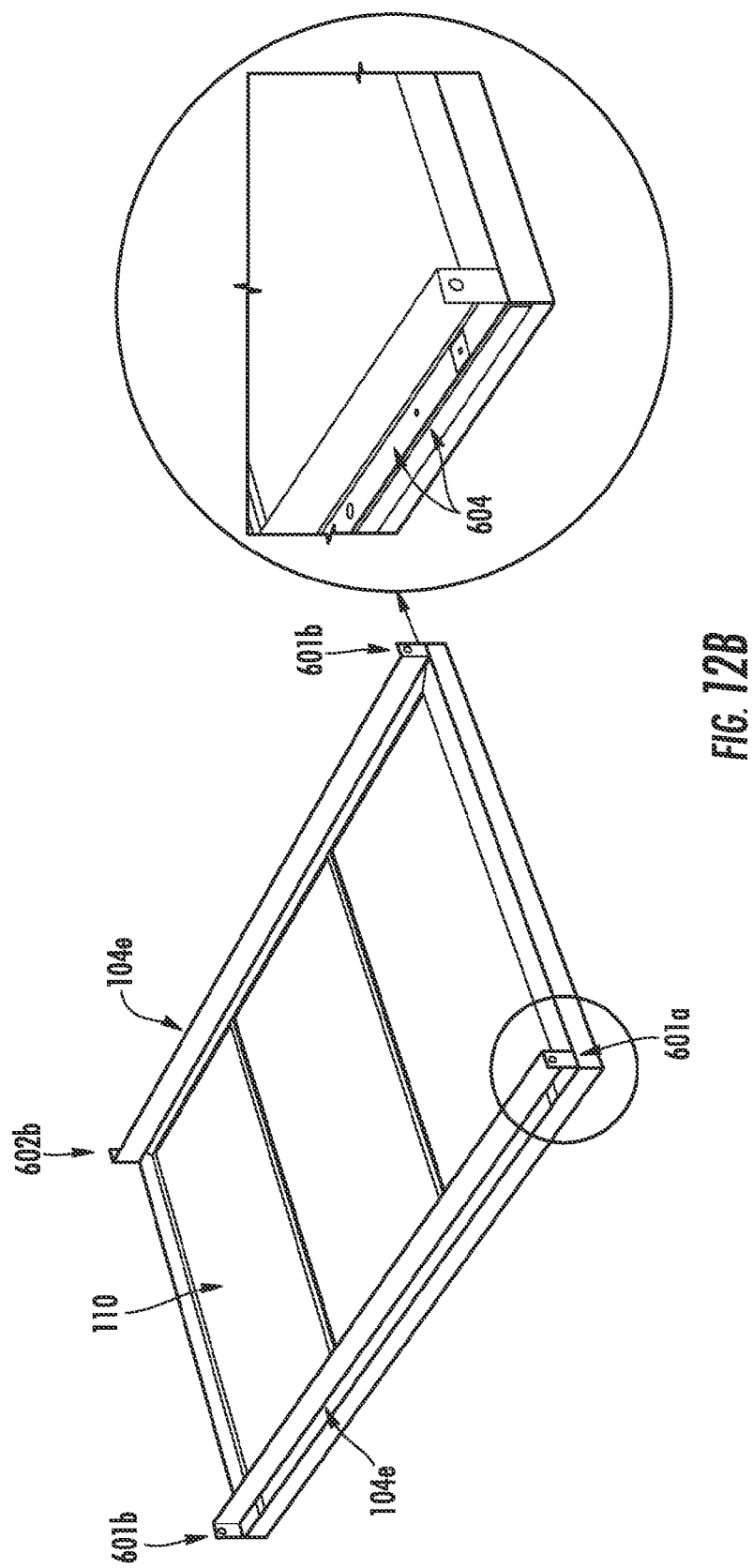
FIG. 12B is a perspective view of an attachment module of a solar module mounting system attached to a solar panel module.

Referring to FIGS. 12A and 12B attachment module 140e includes two facilities 601a and 601b (e.g., flanges or tabs including one or more bolt or screw holes) which can each attach to a support frame (e.g., each facility may be attached to adjacent support frames in an array). Elongated member 602 extends between facilities 601a and 601b, and includes surfaces 604 adapted to be placed in intimate contact with flange 606 on solar panel module 110. One or more threaded or unthreaded screw or bolt holes may be used to secure attachment module 140c to flange 606. Attachment module 140e may include one or more apertures 608 (or other slots, openings, etc.) to allow access to one or more features on module 110 such as a ground lug, wire connector, etc (see FIG. 12B, inset).

Note that when attachment module 140e is used to mount solar panel module 110 on one or more support frames 120, the elongated member 602 operates to spread the force on the module 110 over a relatively large area (e.g. as compared to the mounting configuration shown in FIGS. 6A-6C, where attachment modules 140 couple to solar panel module 110 at four discrete positions), thereby reducing potentially disadvantageous effect due to, e.g., bowing or bending of solar panel module 110.

Figure 11:
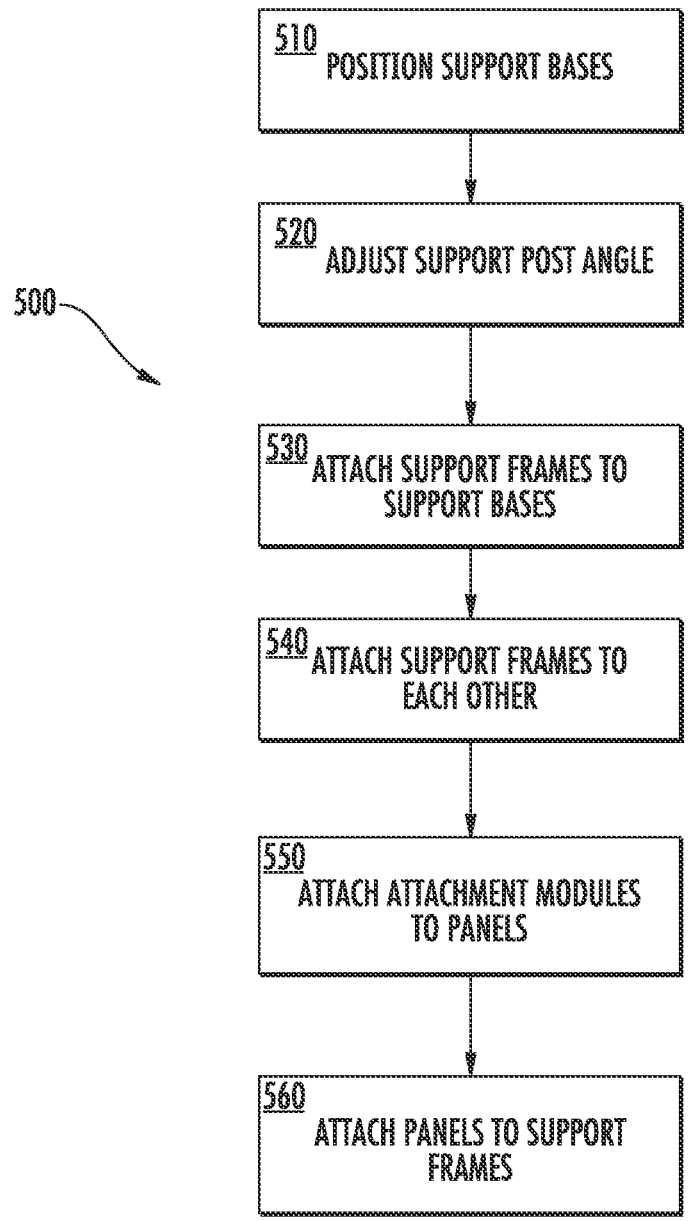
FIG. 11 is a flowchart of a method of forming an array of solar panel modules.

Referring to FIG. 11, there is illustrated a flowchart 500 of a method of forming a solar module array of the type described above.

In act 510, support bases 130 are positioned on the ground (or another surface). In some embodiments, ballast may be added to secure the bases to the ground. In some embodiments, one or more nails (e.g., 12" nails) or similar devices may be embedding in the ground through support base 130 (in addition to or as an alternative to ballast) to secure the support base to the ground. In some embodiments support base 130 may include apertures, openings, slots, etc. to accommodate the nails.

In act 520, the angles of support posts 131 relative to support pans 132 are adjusted to compensate for local undulations in the ground, and set to a desired angle. For example, as described above, pivot 133 may be used to adjust the angle, and pivot bolts 134a and 134b may be tightened to prevent further pivoting thereby setting the angle in place.

In act 530, support frames 120 are attached to support posts 131 at heights selected to compensate for local undulations in the ground. For example, as described above, support post attachment mechanism 121 includes several bolt holes spaced apart vertically. Mechanism 121 receives support post 131 and support post 131 is bolted to mechanism 121 with bolt 122 at a desired height using support post bolt hole 135.

In act 540, support frames 120 are attached to each other to form columns of the array. As described in detail above, in some embodiments, the support frames may be attached in such a way that the spacing of the support frames 120 may be varied over the array (e.g., to provide varied row to row spacings). Further, as described in detail above, in some embodiments the some or all of the attachment points for support frames may be pivotable, to allow for adjustment of the angle orientation of the attached support frames (e.g., to accommodate regions of varying slope in the surface on which the array is located). In some embodiments, the cross bracing is attached between support frames in adjacent columns in the array (e.g. as shown in FIGS. 8 and 8A). In some embodiments, cross bracing 801 may be attached loosely, and tightened after the attachment of the solar panel modules 110 to the support frames 120, e.g., as described in act 560 described below.

In act 550, attachment modules 140 are attached to solar panel modules 110.

In act 560, solar panel modules 110 are attached to support frames 120 using the attachment modules 140. Note that, in some embodiments, solar panel modules 110 may be attached to the support frames 120 only after all or substantially all of the support frames 120 are in place and attached. As described above, in some embodiments, cross bracing 801 may be tightened after the attachment of the solar panel modules 110.

It is to be appreciated that acts 510-560 of flowchart 500 may in some embodiments be performed in alternate orders. It is also to be appreciated that not all acts need be performed in all embodiments, and that in some embodiments additional or alternate acts may be performed.

Some embodiments of the installation method described above may include further acts, including: e.g., running wires through one or more wire chases in the array to connect solar panel modules 110, or to provide grounding. Some embodiments may include the act of forming ballast at or near the site on which array is located (e.g., using cement, concrete, etc.).

Solar panel module installation systems of the type described herein provide a number of features and advantages. In some embodiments, the installation may be completed without the use of heavy tools and machinery. For example, as described above, in some embodiments, none or substantially none, of the components of the system are embedded in the ground. Accordingly, the need for excavation tools (e.g., post hole diggers, etc.) is avoided.

In some embodiments, the entire system may be composed of only a few different component types. For example, in some embodiments, the system includes only sets of support bases 130, support frames 120, attachment modules 140 and, optionally, cross bracing 801 and various hardware (e.g., limited to screws, nuts, and bolts). In some embodiments, an entire array may be constructed using only these sets of identical components. However, as described in detail above, the installation remains highly customizable, with the ability to adjust for surface undulations, variations in surface slope, variation in array element spacing, etc. Note also that the use of only a few components simplifies manufacturing and shipping.

In various embodiments, the various devices, systems, components, features, techniques, etc. described herein may be used in any suitable combination.

Having thus described several aspects of at least one embodiment of this technology, it is to be appreciated various alterations, modifications, and improvements will readily occur to those skilled in the art. Such alterations, modifications, and improvements are intended to be part of this disclosure, and are intended to be within the spirit and scope of the embodiments. Accordingly, the foregoing description and drawings are by way of example only.

What is claimed is:

1. A method of installing a solar panel array, the method comprising the steps of:
    obtaining a first support mechanism comprising:
        a support post pivotably attached to a support base and multiple attachment points on the support post configured for attaching a solar panel at different heights above the support base;
        a support frame coupled to the support post, the support frame comprising a first elongated member coupled to the support post and extending from a front end to a rear end along a direction substantially perpendicular to the support post, a second elongated member extending at an angle to the first elongated member between a front end coupled to the front end of the first elongated member and a rear end, the second elongated member include at least one facility adapted to receive an attachment module to couple the solar panel to the support frame, and a facility for adjusting the height of the first elongated member relative to the support base to a selected one of a plurality of heights;
    selecting an angular orientation of the support post with respect to the support base;
    setting the selected an angular orientation of the support post;
    selecting a height of the first elongated member relative to the support base;
    setting the height of the first elongated member relative to the support base to the selected height;
    coupling the attachment module to the second elongated member;
    obtaining a first solar panel;
    selecting one of the multiple attachment points at a selected height on the first support mechanism for attaching the first panel; and attaching the first panel to the first support mechanism at the selected height using the selected one of the multiple attachment points.

2. The method of claim 1, wherein the angular orientation of the support post is selected to compensate for a local undulation in a surface on which the first support mechanism is located.

3. The method of claim 2, wherein the height on the first support mechanism for attaching the panel is selected to compensate for the local undulation in the surface on which the first support mechanism is located.

4. The method of claim 3, wherein attaching the first panel to the first support mechanism comprises coupling an attachment module to the first solar panel; and after coupling the attachment module to the first solar panel, coupling the attachment module to the first support mechanism.

5. The method of claim 1, wherein the support frame comprises a facility for adjusting the angle of the second elongated member to the first elongated member to a selected one of a plurality of angles;
the method comprising:
selecting a mounting angle of the solar panel;
setting the angle of the second elongated member to the first elongated member to correspond to the mounting angle of the solar panel.

6. The method of claim 1, further comprising:
obtaining a second solar panel;
attaching the second solar panel to the first support mechanism by coupling an attachment module to the second solar panel; and, after coupling the attachment module to the second solar panel, coupling the attachment module to the first support mechanism.

7. The method of claim 1, further comprising:
obtaining a second support mechanism, the second support mechanism comprising:
a support post pivotably attached to a support base; and
a support frame coupled to the support post, the support frame comprising:
a first elongated member coupled the support post and extending from a front end to a rear end along a direction substantially perpendicular to the support post; and
a second elongated member extending at an angle to the first elongated member between a front end coupled to the front end of the first elongated member and a rear end, the second elongated member include at least one facility adapted to receive a second attachment module to couple the solar panel to the support frame; and
for the second support mechanism:
selecting an angular orientation of the support post with respect to the support base and selecting a height on the first support mechanism for attaching the first panel, wherein at least one of the angular orientation of the support post and the height on the first support mechanism for attaching the first panel is selected to compensate for a local undulation in a surface on which the second support mechanism is located;
setting the selected angular orientation of the support post; and
attaching the first panel to the second support mechanism at the selected height.

8. The method of claim 1, further comprising:
obtaining a second support mechanism, the second support mechanism comprising:
a support post pivotably attached to a support base; and
a support frame coupled to the support post, the support frame comprising:
a first elongated member coupled to the support post and extending from a front end to a rear end along a direction substantially perpendicular to the support post;
a second elongated member extending at an angle to the first elongated member between a front end coupled to the front end of the first elongated member and a rear end, the second elongated member include at least one facility adapted to receive a second attachment module to couple the solar panel to the support frame; and
attaching the front end of the first elongated member of the first support mechanism to the rear end of the first elongated member of the second support mechanism.

9. The method of claim 8, wherein the front end of the first elongated member of the first support mechanism and the rear end of the first elongated member of the second support mechanism are attached using a facility which allows for the relative position and angular orientation of the first elongated members of the first and second support mechanisms to be adjusted; and
further comprising selecting and setting the relative position and angular orientation of the attached elongated members.

10. The method of claim 9, wherein the relative position or angular orientation of the attached first elongated members of the first and second support mechanisms is adjusted to compensate for a variation in change in a slope of the surface underlying the first and second support mechanisms.

11. A method of installing a solar panel array, the method comprising the steps of:
obtaining a first plurality of solar panels;
placing a first plurality of support mechanisms, each comprising a support post pivotably attached to a support base and multiple attachment points on the support post configured for attaching a solar panel at different heights above the support base, on a first region of a surface, the first region having a generally flat portion and localized undulations;
for each respective support mechanism in the first plurality:
selecting an angular orientation of the support post with respect to the support base;
setting the selected an angular orientation of the support post;
selecting one of the multiple attachment points at a selected height on the first support mechanism for attaching the first panel;
attaching the first panel to the first support mechanism at the selected height using the selected one of the multiple attachment points;
wherein the selected angular orientations and the attachment heights are selected to compensate for the local undulations in the first region such that each of the first plurality of panels are positioned with substantially the same orientation relative to the generally flat portion of the surface in the first region;
obtaining a second plurality of support mechanisms;
attaching at least one of the support mechanisms of the first plurality with at least one support mechanisms in the second plurality;
wherein, for each support mechanism of the first plurality which is attached to a support mechanism in the second plurality:
the support mechanism of the first plurality comprises an attachment facility that allows for the relative angular orientation of two support members to be adjusted to one of a plurality of orientations; and attaching the support mechanism using the facility to set the relative angular orientation to compensate for the difference in the slopes of the first region and a second region.

12. The method of claim 11, wherein the orientation relative to the generally flat portion of the surface in the first region comprises a height of the at least one respective solar panel relative to the generally flat portion of the surface in the first region.

13. The method of claim 11, wherein the first plurality of panels are each attached to a respective support mechanism while the support mechanism is unattached to any other support mechanisms.

14. The method of claim 13, further comprising attaching each support mechanism in the first plurality of support mechanisms to at least one other support mechanism in the first plurality of support mechanisms.

15. The method of claim 14, further comprising: attaching cross bracing between at least two adjacent support mechanisms in the first plurality of support mechanisms.

16. The method of claim 11, wherein each of the support mechanisms in the first plurality are substantially identical.

17. The method of claim 11, further comprising:

obtaining a second plurality of solar panels;

placing the second plurality of support mechanisms, each comprising a support post pivotably attached to a support base, on the second region of the surface, the first region having a generally flat portion and localized undulations, the second region being adjacent to the first region and having a general slope which differs from a general slope of the first region;

for each respective support mechanism in the second plurality:

selecting an angular orientation of the support post with respect to the support base;

setting the selecting an angular orientation of the support post;

selecting an attachment height on the first support mechanism for attaching a solar panel; and attaching at least one respective solar panel from the second plurality of solar panels to the respective support mechanism at the selected height;

wherein the angular orientations and the attachment heights are selected to compensate for the local undulations in the second region such that each of the second plurality of panels are positioned with substantially the same orientation relative to the generally flat portion of the surface in the second region.

18. The method of claim 11, wherein each support mechanism of the first and second pluralities of support mechanisms are substantially identical.

19. The method of claim 10, wherein substantially no portion of each of the support mechanisms in the first plurality is located below the surface.

20. The method of claim 19, further comprising driving one or more nails through the at least one of the support mechanisms and the surface to secure the support mechanism to the surface.

* * * * *